United States Patent
Hayasaka et al.

(10) Patent No.: US 10,965,861 B2
(45) Date of Patent: Mar. 30, 2021

(54) IMAGE PROCESSING DEVICE, IMAGE PROCESSING METHOD, AND PROGRAM

(71) Applicant: SONY CORPORATION, Tokyo (JP)

(72) Inventors: Kengo Hayasaka, Saitama (JP); Katsuhisa Ito, Tokyo (JP)

(73) Assignee: SONY CORPORATION, Tokyo (JP)

(*) Notice: Subject to any disclaimer, the term of this patent is extended or adjusted under 35 U.S.C. 154(b) by 59 days.

(21) Appl. No.: 16/344,242

(22) PCT Filed: Oct. 25, 2017

(86) PCT No.: PCT/JP2017/038470
§ 371 (c)(1),
(2) Date: Apr. 23, 2019

(87) PCT Pub. No.: WO2018/088212
PCT Pub. Date: May 17, 2018

(65) Prior Publication Data
US 2019/0268546 A1 Aug. 29, 2019

(30) Foreign Application Priority Data

Nov. 8, 2016 (JP) .............................. JP2016-217764

(51) Int. Cl.
*H04N 5/232* (2006.01)
*H04N 5/262* (2006.01)
(Continued)

(52) U.S. Cl.
CPC ......... *H04N 5/232127* (2018.08); *G06T 1/00* (2013.01); *H04N 5/225* (2013.01); *H04N 5/232* (2013.01); *H04N 5/2621* (2013.01)

(58) Field of Classification Search
CPC .. H04N 5/232127; H04N 5/225; H04N 5/232; H04N 5/2621; H04N 5/247;
(Continued)

(56) References Cited

U.S. PATENT DOCUMENTS 8,619,082 B1* 12/2013 Ciurea .............. G02B 27/0075
345/427
9,100,635 B2* 8/2015 Duparre .............. H04N 17/002
(Continued)

FOREIGN PATENT DOCUMENTS

| JP | 2013-121050 A | 6/2013 |
| JP | 2014-225102 A | 12/2014 |
| JP | 2015-201722 A | 11/2015 |

OTHER PUBLICATIONS

Wilburn et al., High Performance Imaging Using Large Camera Arrays, ACM Transactions on Graphics (TOG), Jul. 2005, pp. 765-776, vol. 24, Issue 3.

*Primary Examiner* — Pritham D Prabhakher
(74) *Attorney, Agent, or Firm* — Paratus Law Group, PLLC

(57) ABSTRACT

The present technology relates to an image processing device, an image processing method, and a program that enable refocusing accompanied by desired blurring. A light collection processing unit performs a light collection process to generate a processing result image focused at a predetermined distance, by shifting the pixels of images of a plurality of viewpoints in accordance with a shift amount and integrating the pixel values. In the light collection process, the pixels are shifted in accordance with a corrected shift amount obtained by correcting the shift amount with correction coefficients for the respective viewpoints. The present technology can be applied in a case where a refocused image is obtained from images of a plurality of viewpoints, for example.

10 Claims, 17 Drawing Sheets

(51) Int. Cl.
*H04N 5/225* (2006.01)
*G06T 1/00* (2006.01)

(58) Field of Classification Search
CPC ........... H04N 5/23229; H04N 13/0214; H04N 13/0271; H04N 13/218; H04N 13/207; H04N 13/111; G06T 1/00; G06T 7/0075; G06T 7/0022; G06T 2207/10012; G06T 2207/10028
USPC .......................................................... 348/239
See application file for complete search history.

(56) References Cited

U.S. PATENT DOCUMENTS

| | | | |
|---|---|---|---|
| 9,208,569 B2* | 12/2015 | Yokoyama | G06T 7/50 |
| 9,942,474 B2* | 4/2018 | Venkataraman | G06T 7/55 |
| 10,122,988 B2* | 11/2018 | Kitago | H04N 5/23229 |
| 10,122,993 B2* | 11/2018 | Venkataraman | H04N 13/243 |
| 10,127,639 B2* | 11/2018 | Miura | G06K 9/00228 |
| 10,334,229 B2* | 6/2019 | Vandame | H04N 13/25 |
| 2012/0063697 A1* | 3/2012 | Han | G06T 5/004 |
| | | | 382/255 |
| 2014/0219576 A1* | 8/2014 | Yokoyama | H04N 5/23212 |
| | | | 382/255 |
| 2014/0253760 A1* | 9/2014 | Watanabe | H04N 5/23232 |
| | | | 348/239 |
| 2015/0287208 A1* | 10/2015 | Hiasa | H04N 13/218 |
| | | | 348/49 |
| 2016/0021298 A1* | 1/2016 | Tsutsumi | H04N 5/23212 |
| | | | 348/349 |
| 2016/0337632 A1* | 11/2016 | Vandame | G02B 27/0075 |
| 2016/0360186 A1* | 12/2016 | Javidi | G06K 9/4676 |
| 2017/0039686 A1* | 2/2017 | Miura | G06T 5/50 |
| 2017/0085858 A1* | 3/2017 | Kitago | H04N 5/2254 |

* cited by examiner

IMAGE PROCESSING DEVICE, IMAGE PROCESSING METHOD, AND PROGRAM

CROSS REFERENCE TO PRIOR APPLICATION

This application is a National Stage Patent Application of PCT International Patent Application No. PCT/JP2017/038470 (filed on Oct. 25, 2017) under 35 U.S.C. § 371, which claims priority to Japanese Patent Application No. 2016-217764 (filed on Nov. 8, 2016), which are all hereby incorporated by reference in their entirety.

TECHNICAL FIELD

The present technology relates to an image processing device, an image processing method, and a program, and more particularly, to an image processing device, an image processing method, and a program for enabling refocusing accompanied by desired blurring, for example.

BACKGROUND ART

A light field technique has been suggested for reconstructing, from images of a plurality of viewpoints, a refocused image, that is, an image captured with an optical system whose focus is changed, or the like, for example (see Non-Patent Document 1, for example).

For example, Non-Patent Document 1 discloses a refocusing method using a camera array formed with 100 cameras.

CITATION LIST

Non-Patent Document

Non-Patent Document 1: Bennett Wilburn et al., "High Performance imaging Using Large Camera Arrays"

SUMMARY OF THE INVENTION

Problems to be Solved by the Invention

As for refocusing, the need for realizing refocusing accompanied by desired blurring of an entire image while keeping focus is expected to increase in the future.

The present technology has been made in view of such circumstances, and aims to enable refocusing accompanied by desired blurring.

Solutions to Problems

An image processing device or a program according to the present technology is an image processing device including: an acquisition unit that acquires images of a plurality of viewpoints; and a light collection processing unit that performs a light collection process to generate a processing result image focused at a predetermined distance, by setting a shift amount for shifting pixels of the images of the plurality of viewpoints, shifting the pixels of the images of the plurality of viewpoints in accordance with the shift amount, and integrating the pixel values, in which the light collection processing unit shifts the pixels in accordance with a corrected shift amount obtained by correcting the shift amount with correction coefficients for the respective viewpoints, or a program for causing a computer to function as such an image processing device.

An image processing method according to the present technology is an image processing method including: acquiring images of a plurality of viewpoints; and performing a light collection process to generate a processing result image focused at a predetermined distance, by setting a shift amount for shifting pixels of the images of the plurality of viewpoints, shifting the pixels of the images of the plurality of viewpoints in accordance with the shift amount, and integrating the pixel values, in which, in the light collection process, the pixels are shifted in accordance with a corrected shift amount obtained by correcting the shift amount with correction coefficients for the respective viewpoints.

In an image processing device, an image processing method, and a program according to the present technology, images of a plurality of viewpoints are acquired, and a light collection process is performed to generate a processing result image focused at a predetermined distance, by setting a shift amount for shifting pixels of the images of the plurality of viewpoints, shifting the pixels of the images of the plurality of viewpoints in accordance with the shift amount, and integrating pixel values. In the light collection process, the pixels are shifted in accordance with a corrected shift amount obtained by correcting the shift amount with correction coefficients for the respective viewpoints.

Note that the image processing device may be an independent device, or may be an internal block in a single device.

Meanwhile, the program to be provided may be transmitted via a transmission medium or may be recorded on a recording medium.

Effects of the Invention

According to the present technology, it is possible to perform refocusing accompanied by desired blurring.

Note that effects of the present technology are not limited to the effects described herein, and may include any of the effects described in the present disclosure.

MODES FOR CARRYING OUT THE INVENTION

<Embodiment of an Image Processing System to Which the Present Technology Is Applied>

Figure 1:
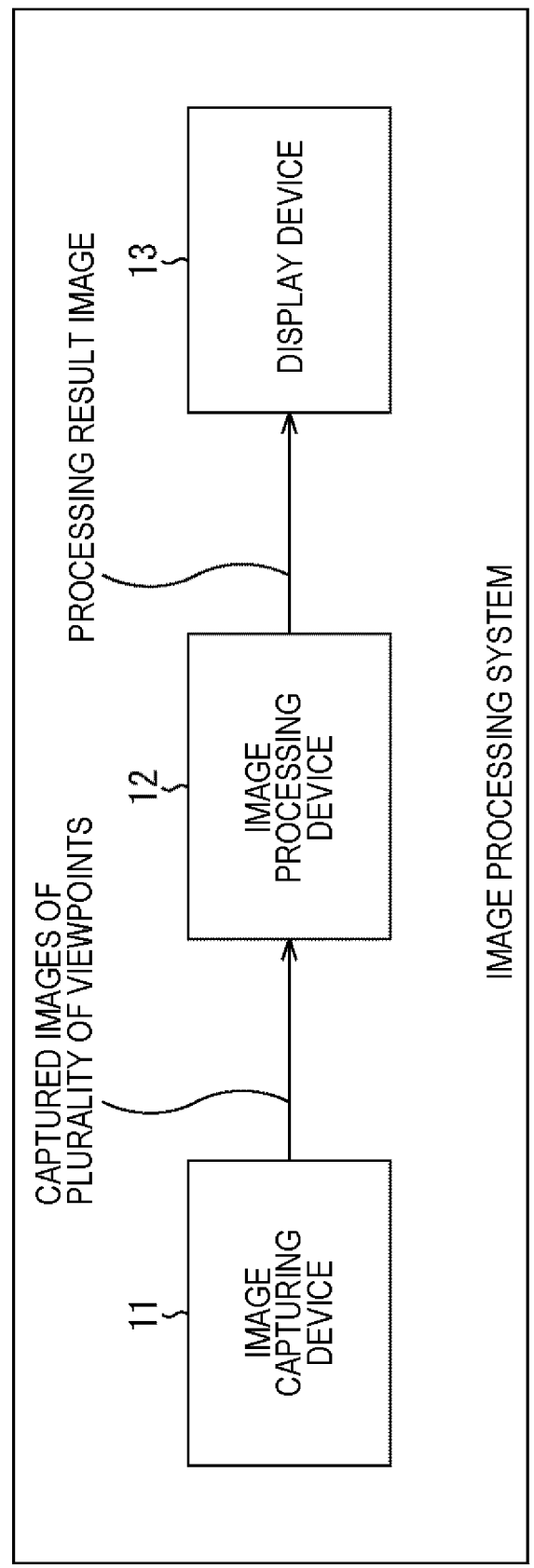
FIG. 1 is a block diagram showing an example configuration of an embodiment of an image processing system to which the present technology is applied.

FIG. 1 is a block diagram showing an example configuration of an embodiment of an image processing system to which the present technology is applied.

In FIG. 1, the image processing system includes an image capturing device 11, an image processing device 12, and a display device 13.

The image capturing device 11 captures images of an object from a plurality of viewpoints, and supplies, for example, (almost) pan-focus images obtained as a result. of the capturing from the plurality of viewpoints, to the image processing device 12.

The image processing device 12 performs image processing such as refocusing for generating (reconstructing) an image focused on a desired object by using the captured images of the plurality of viewpoints supplied from the image capturing device 11, and supplies a processing result image obtained as a result of the image processing, to the display device 13.

The display device 13 displays the processing result image supplied from the image processing device 12.

Note that, in FIG. 1, the image capturing device 11, the image processing device 12, and the display device 13 constituting the image processing system can be all installed in an independent apparatus such as a digital (still/video) camera, or a portable terminal like a smartphone or the like, for example.

Alternatively, the image capturing device 11, the image processing device 12, and the display device 13 can be installed in apparatuses independent of one another.

Furthermore, any two devices among the image capturing device 11, the image processing device 12, and the display device 13 can be installed in an apparatus independent of the apparatus in which the remaining one device is installed.

For example, the image capturing device 11 and the display device 13 can be installed in a portable terminal owned by a user, and the image processing device 12 can be installed in a server in a cloud.

Alternatively, some of the blocks of the image processing device 12 can be installed in a server in a cloud, and the remaining blocks of the image processing device 12, the image capturing device 11, and the display device 13 can be installed in a portable terminal.

<Example Configuration of the Image Capturing Device 11>

Figure 2:
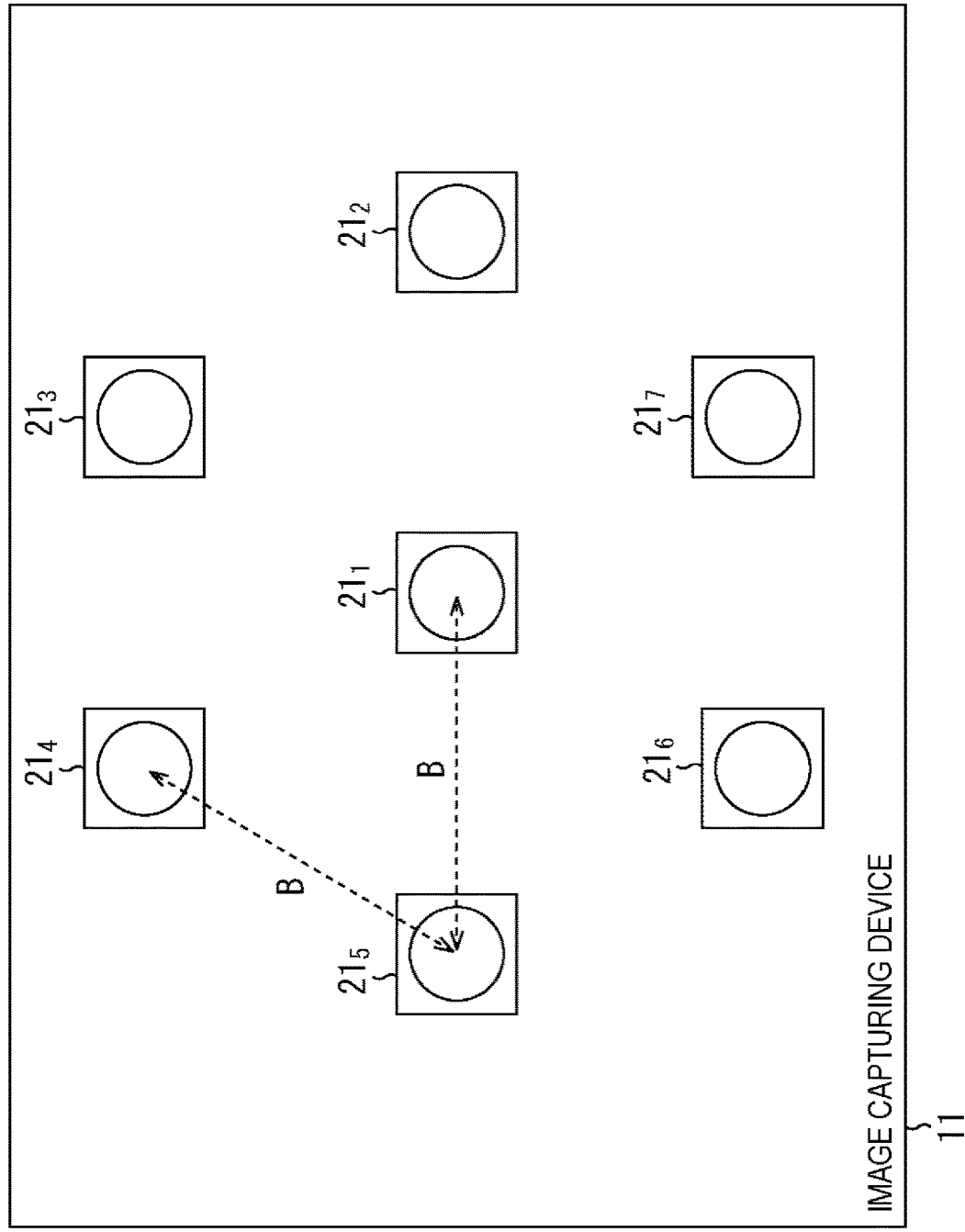
FIG. 2 is a rear view of an example configuration of an image capturing device 11.

FIG. 2 is a rear view of an example configuration of the image capturing device 11 shown in FIG. 1.

The image capturing device 11 includes a plurality of camera units (hereinafter also referred to as cameras) $21_i$ that captures images having the values of RGB as pixel values, for example, and the plurality of cameras $21_i$ captures images from a plurality of viewpoints.

In FIG. 2, the image capturing device 11 includes seven cameras $21_1$, $21_2$, $21_3$, $21_4$, $21_5$, $21_6$, and $21_7$ as the plurality of cameras, for example, and these seven cameras $21_1$ through $21_7$ are arranged in a two-dimensional plane.

Further, in FIG. 2, the seven cameras $21_1$ through $21_7$ are arranged such that one of the seven cameras 211 through $21_7$, such as the camera $21_1$, for example, is disposed at the center, and the other six cameras $21_2$ through $21_7$ are disposed around the camera $21_1$, to form a regular hexagon.

Therefore, in FIG. 2, the distance between one camera $21_i$ (i=1, 2, . . . , or 7) out of the seven cameras $21_1$ through $21_7$ and a camera $21_j$ (j=1, 2, . . . or 7) closest to the camera $21_i$ (the distance between the optical axes) is the same distance of B.

The distance of B between the cameras $21_i$ and $21_3$ may be about 20 mm, for example. In this case, the image capturing device 11 can be designed to have almost the same size as the size of a card such as an IC card.

Note that the number of the cameras $21_i$ constituting the image capturing device 11 is not necessarily seven, and it is possible to adopt a number from two to six, or the number eight or greater.

Also, in the image capturing device 11, the plurality of cameras $21_i$ may be disposed at any appropriate positions, other than being arranged to form a regular polygon such as a regular hexagon as described above.

Hereinafter, of the cameras $21_1$ through $21_7$, the camera $21_1$ disposed at the center will be also referred to as the reference camera $21_i$, and the cameras $21_2$ through $21_7$ disposed around the reference camera $21_1$ will be also referred to as the peripheral cameras $21_2$ through $21_7$.

Figure 3:
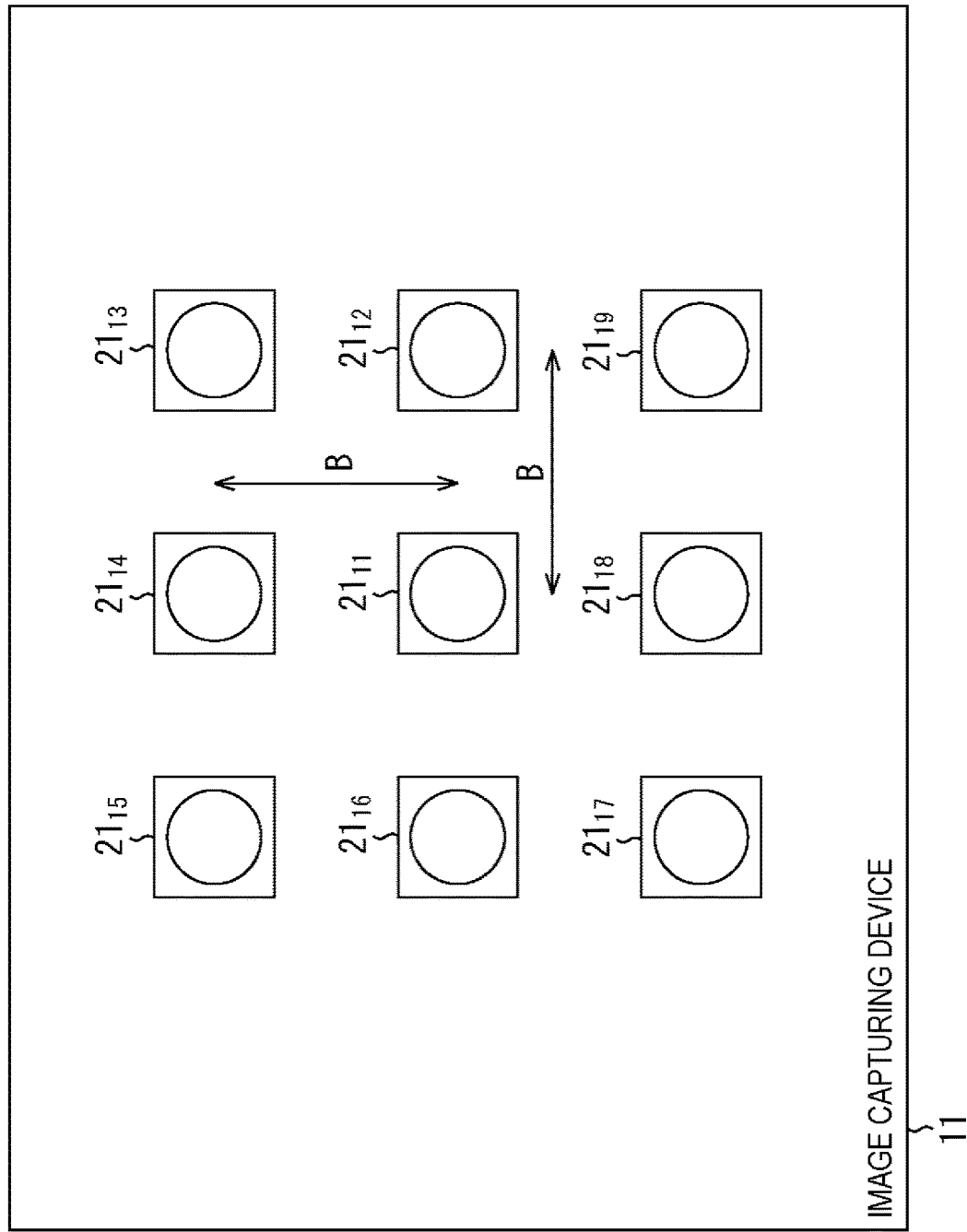
FIG. 3 is a rear view of another example configuration of the image capturing device 11.

FIG. 3 is a rear view of another example configuration of the image capturing device 11 shown in FIG. 1.

In FIG. 3, the image capturing device 11 includes nine cameras $21_{11}$ through $21_{19}$, and the nine cameras $21_{11}$ through $21_{19}$ are arranged in three rows and three columns. Each of the 3×3 cameras $21_i$ (i=11, 12, . . . , and 19) is disposed at the distance of B from an adjacent camera $21_j$ (j=11, 12, . . . , or 19) above the camera $21_i$, below the camera $21_i$, or to the left or right, of the camera $21_i$.

In the description below, the image capturing device 11 includes the seven cameras $21_1$ through $21_7$ as shown in FIG. 2, for example, unless otherwise specified.

Meanwhile, the viewpoint of the reference camera $21_1$ is also referred to as the reference viewpoint, and a captured image PL1 captured by the reference camera $21_1$ is also referred to as the reference image PL1. Further, a captured image PL#i captured by a peripheral camera $21_i$ is also referred to as the peripheral image PL#i.

Note that the image capturing device 11 includes a plurality of cameras $21_i$ as shown in FIGS. 2 and 3, but may be formed with a microlens array (MLA) as disclosed by Ren. Ng and seven others in "Light Field Photography with a Hand-Held Plenoptic Camera", Stanford Tech Report CTSR 2005-02, for example. Even in a case where the image capturing device 11 is formed with an MLA, it is possible to obtain images substantially captured from a plurality of viewpoints.

Further, the method of capturing images from a plurality of viewpoints is not necessarily the above method by which the image capturing device 11 includes a plurality of cameras $21_i$ or the method by which the image capturing device 11 is formed with an MLA.

<Example Configuration of the Image Processing Device 12>

Figure 4:
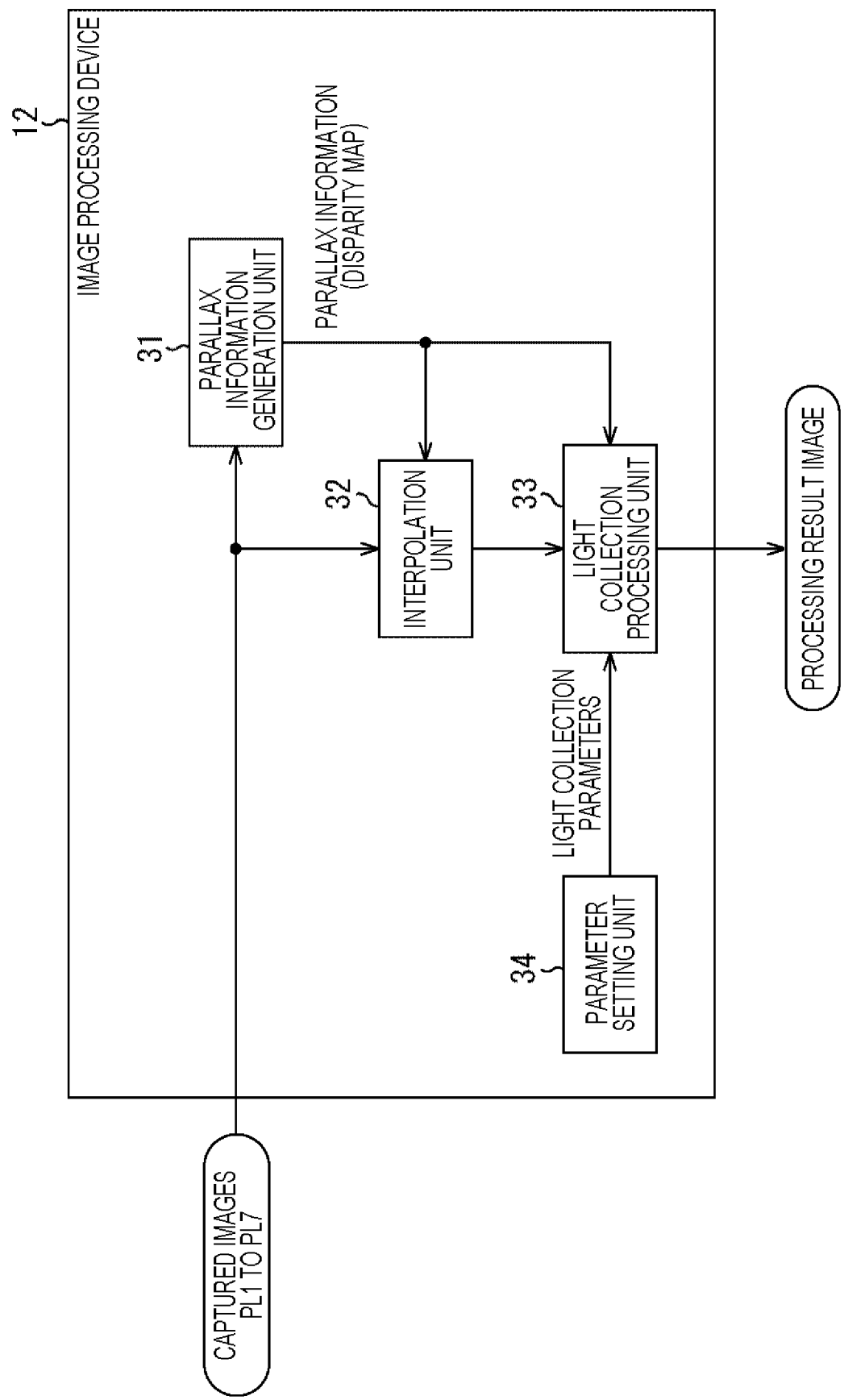
FIG. 4 is a block diagram showing an example configuration of an image processing device 12.

FIG. 4 is a block diagram showing an example configuration of the image processing device 12 shown in FIG. 1.

In FIG. 4, the image processing device 12 includes a parallax information generation unit 31, an interpolation unit 32, a light collection processing unit 33, and a parameter setting unit 34.

The image processing device 12 is supplied with captured images PL1 through PL7 captured from seven viewpoints by the cameras $21_1$ through $21_7$, from the image capturing device 11.

In the image processing device 12, the captured images PL#i are supplied to the parallax information. generation unit 31 and the interpolation unit 323.

The parallax information generation unit 31 obtains parallax information using the captured images PL#i supplied from the image capturing device 11, and supplies the parallax information to the interpolation unit 32 and the light collection processing unit 33.

Specifically, the parallax information generation unit 31 performs a process of obtaining the parallax information between each of the captured images PL#i supplied from the image capturing device 11 and the other captured images PL#j, as image processing of the captured images PL#i of a plurality of viewpoints, for example. The parallax information generation unit 31 then generates a map in which the parallax information is registered for (the position of) each pixel of the captured images, for example, and supplies the map to the interpolation unit 32 and the light collection processing unit 33.

Here, any appropriate information that can be converted into parallax, such as a disparity representing parallax with the number of pixels or distance in the depth direction corresponding to parallax, can be adopted as the parallax information. In this embodiment, disparities are adopted as the parallax information, for example, and in the parallax information generation unit 31, a disparity map in which the disparity is registered is generated as a map in which the parallax information is registered.

Using the captured images PL1 through PL7 of the seven viewpoints of the cameras $21_1$ through $21_7$ from the image capturing device 11, and the disparity map from the parallax information generation unit 31, the interpolation unit 32 performs interpolation to generate images to be obtained from viewpoints other than the seven viewpoints of the cameras $21_1$ through $21_7$.

Here, through the later described light collection process performed by the light collection processing unit 33, the image capturing device 11 including the plurality of cameras $21_1$ through $21_7$ can be made to function as a virtual lens having the cameras $21_1$ through $21_7$ as a synthetic aperture. In the image capturing device 11 shown in FIG. 2, the synthetic aperture of the virtual lens has a substantially circular shape with a diameter of approximately 2B connecting the optical axes of the peripheral cameras $21_2$ through $21_7$.

For example, where the viewpoints are a plurality of points equally spaced in a square having the diameter of 2B of the virtual lens (or a square inscribed in the synthetic aperture of the virtual lens), or the viewpoints are 21 points in the horizontal direction and 21 points in the vertical direction, for example, the interpolation unit 32 performs interpolation to generate a plurality of 21×21−7 viewpoints that are the 21×21 viewpoints minus the seven viewpoints of the cameras $21_1$ through $21_7$.

The interpolation unit 32 then supplies the captured images PL1 through PL7 of the seven viewpoints of the cameras $21_1$ through $21_7$ and the images of the 21×21−7 viewpoints generated by the interpolation using captured images, to the light collection processing unit 33.

Here, in the interpolation unit 32, the images generated by the interpolation using captured images is also referred to as interpolation images.

Further, the images of the 21×21 viewpoints, which are the total of the captured images PL1 through PL7 of the seven viewpoints of the cameras $21_1$ through $21_7$ and the interpolation images of the 21×21−7 viewpoints supplied from the interpolation unit 32 to the light collection processing unit 33, are also referred to as viewpoint images.

The interpolation in the interpolation unit 32 can be considered as a process of generating viewpoint images of a larger number of viewpoints (21×21 viewpoints in this case) from the captured images PL1 through PL7 of the seven viewpoints of the cameras $21_1$ through $21_7$. The process of generating the viewpoint images of the large number of viewpoints can be regarded as a process of reproducing light beams entering the virtual lens having the cameras $21_1$ through $21_7$ as synthetic apertures from real-space points in the real space.

Using the viewpoint images of the plurality of viewpoints supplied from the interpolation unit 32, the light collection processing unit 33 performs a light collection process that is image processing equivalent to forming an image of the object by collecting light beams that have passed through an optical system such as a lens from the object, onto an image sensor or a film in a real camera.

In the light collection process by the light collection processing unit 33, refocusing is performed to generate (reconstruct) an image focused on a desired object. The refocusing is performed using the disparity map supplied from the parallax information generation unit 31 and a light collection parameter supplied from the parameter setting unit 34.

The image obtained through the light collection process by the light collection processing unit 33 is output as a processing result image to (the display device 13).

The parameter setting unit 34 sets a pixel of the captured image PL#i (the reference image PL1, for example) located at a position designated by the user operating an operation unit (not shown), a predetermined application, or the like, as the focus target pixel for focusing (or showing the object), and supplies the focus target pixel as (part of) the light collection parameter to the light collection processing unit 33.

Other than the above, the parameter setting unit 34 sets the later described correction coefficients in accordance with a user operation or the like, and supplies the correction coefficients as (some other ones of) light collection parameters to the light collection processing unit 33.

Note that the image processing device 12 may be configured as a server, or may be configured as a client. Further, the image processing device 12 may be configured as a server-client system. In a case where the image processing device 12 is configured as a server-client system, some of the blocks of the image processing device 12 can be configured as a server, and the remaining blocks can be configured as a client.

<Process to be Performed by the Image Processing System>

Figure 5:
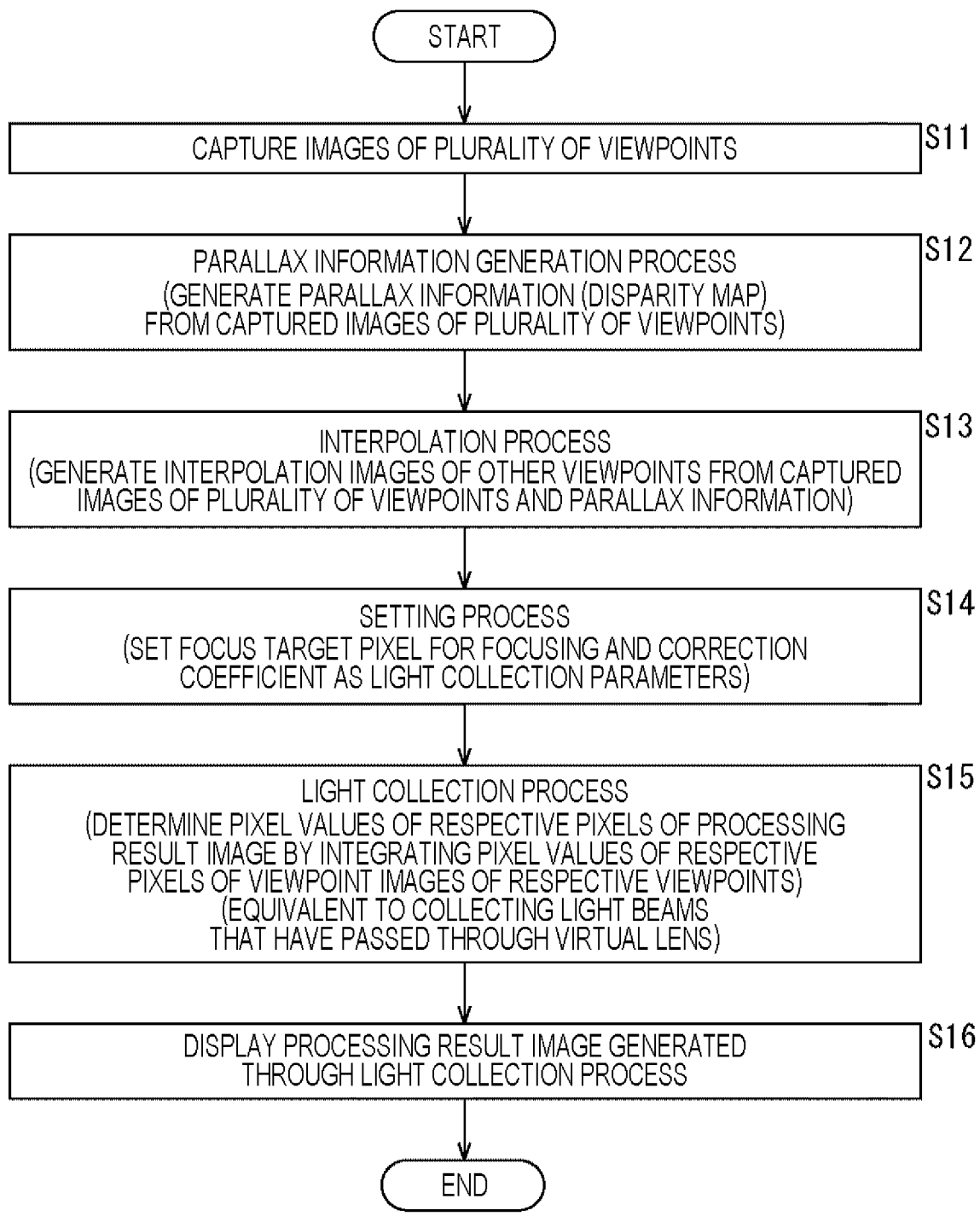
FIG. 5 is a flowchart showing an example process to be performed by the image processing system.

FIG. 5 is a flowchart showing an example process to be performed by the image processing system shown in FIG. 1.

In step S11, the image capturing device 11 captures images PL1 through PL7 of seven viewpoints as a plurality of viewpoints. The captured images PL#i are supplied to the parallax information generation unit 31 and the interpolation unit 32 of the image processing device 12 (FIG. 4).

The process then moves from step S11 on to step S12, and the image processing device 12 acquires the captured image PL#i from the image capturing device 11. Further, in the image processing device 12, the parallax information generation unit 31 performs a parallax information generation process, to obtain the parallax information using the captured image PL#i supplied from the image capturing device 11, and generate a disparity map in which the parallax information is registered.

The parallax information generation unit 31 supplies the disparity map obtained through the parallax information generation process to the interpolation unit 32 and the light collection processing unit 33, and the process moves from step S12 on to step S13. Note that, in this example, the image processing device 12 acquires the captured images PL#i from the image capturing device 11, but the image processing device 12 not only can acquire the captured images PL#i directly from the image capturing device 11 but also can acquire, from a cloud, captured images PL#i that have been captured by the image capturing device 11 or some other image capturing device (not shown), for example, and been stored beforehand into the cloud.

In step S13, the interpolation unit 32 performs an interpolation process of generating interpolation images of a plurality of viewpoints other than the seven viewpoints of the cameras $21_1$ through $21_7$, using the captured images PL1 through PL7 of the seven viewpoints of the cameras $21_1$ through $21_7$ supplied from the image capturing device 11, and the disparity map supplied from the parallax information generation unit 31.

The interpolation unit 32 further supplies the captured images PL1 through PL7 of the seven viewpoints of the cameras $21_1$ through $21_7$ supplied from the image capturing device 11 and the interpolation images of the plurality of viewpoints obtained through the interpolation process, as viewpoint images of a plurality of viewpoints to the light collection processing unit 33. The process then moves from step S13 on to step S14.

In step S14, the parameter setting unit 34 performs a setting process to set the light collection parameters.

In the setting process, the pixel of the reference image PL1 located at a position designated by a user operation or the like, for example, is set as the focus target pixel for focusing.

In the setting process, correction coefficients for correcting a pixel shift amount (a reference shift amount BV or a focus shift amount DP#i that will be described later) for shifting pixels in the light collection process are further set for the respective viewpoints of the viewpoint images obtained by the interpolation unit 32, in accordance with a user operation or the like, for example.

The parameter setting unit 34 supplies (information about) the focus target pixel obtained through the setting process and the correction coefficients for the respective viewpoints as the light collection parameters to the light collection processing unit 33. The process then moves from step S14 on to step S15.

Here, in the setting process, the parameter setting unit 34 can cause the display device 13 to display, for example, the reference image PL1 among the captured images PL1 through PL7 of the seven viewpoints supplied from the image capturing device 11, for example, together with a message prompting designation of the object to be focused on. The parameter setting unit 34 then waits for the user to designate a position (in the object shown) in the reference image PL1 displayed on the display device 13, and can set the pixel of the reference image PL1 located at the position designated by the user as the focus target pixel.

The focus target pixel can be set not only in accordance with user designation as described above, but also in accordance with designation from an application or in accordance with designation based on predetermined rules or the like, for example.

For example, a pixel showing an object moving at a predetermined speed or higher, or a pixel showing an object moving continuously for a predetermined time or longer can be set as the focus target pixel.

In step S15, the light collection processing unit 33 performs a light collection process equivalent to collecting light beams that have passed through the virtual lens having the cameras $21_1$ through $21_7$ as the synthetic aperture from the object onto a virtual sensor (not shown), using the viewpoint images of the plurality of viewpoints from the interpolation unit 32, the disparity map from the parallax information generation unit 31, and the focus target pixel and the correction coefficients for the respective viewpoints as the light collection parameters from the parameter setting unit 34.

The virtual sensor onto which the light beams having passed through the virtual lens are collected is actually a memory (not shown), for example. In the light collection process, the pixel values of the viewpoint images of a plurality of viewpoints are integrated (as the stored value) in the memory as the virtual sensor, the pixel values being regarded as the luminance of the light beams gathered onto the virtual sensor. In this manner, the pixel values of the image obtained as a result of collection of the light beams having passed through the virtual lens are determined.

In the light collection process by the light collection processing unit 33, a reference shift amount BV (described later), which is a pixel shift amount for performing pixel shifting on the pixels of the viewpoint images of the plurality of viewpoints, is set. The pixels of the viewpoint images of the plurality of viewpoints are subjected to pixel shift in accordance with the reference shift amount BV, and are then integrated. The respective pixel values of a processing result image focused on an in-focus point at a predetermined distance are then determined, and thus, processing result image generation, or refocusing, is performed.

Here, an in-focus point is a real-space point in the real space where focusing is achieved, and, in the light collection process by the light collection processing unit 33, the in-focus plane as the group of in-focus points is set with focus target pixels as light collection parameters supplied from the parameter setting unit 34.

Further, the light collection process by the light collection processing unit 33, pixel shift of the pixels of the viewpoint images of the plurality of viewpoints is performed in accordance with the reference shift amount. BV, or, as will be described later, in accordance with the focus shift amount DP#i uniquely determined from the reference shift amount BV. In the light collection process, the focus shift amount DP#i (or the reference shift amount BV) is corrected with the correction coefficients for the respective viewpoints supplied as the light collection parameters from the parameter setting unit 34, and pixel shift is performed on the pixels of the viewpoint images of the plurality of viewpoints in accordance with the corrected focus shift amount DP#i.

As described above, pixel shift is performed on the pixels of the viewpoint images of the plurality of viewpoints is performed in accordance with the corrected focus shift amount. DP#i corrected with the correction coefficients for the viewpoints. Thus, refocusing accompanied by desired blurring can be performed in accordance with the correction coefficients.

The light collection processing unit 33 supplies the processing result image obtained as a result of the light collection process to the display device 13, and the process then moves from step S15 on to step S16.

In step S16, the display device 13 displays the processing result image supplied from the light collection processing unit 33.

Note that, although the setting process in step S14 is performed between the interpolation process in step S13 and the light collection process in step S15 in FIG. 5, the setting of the focus target pixel as a light collection parameter in the setting process can be performed at any appropriate timing during the period from immediately after the capturing of the captured images PL1 through PL7 of the seven viewpoints in step S11 till immediately before the light collection process in step S15.

Further, the setting of the correction coefficients for the respective viewpoints as light collection parameters in the setting process can be performed at an arbitrary timing till immediately before the light collection process in step S15.

Alternatively, the image processing device 12 (FIG. 4) can be formed only with the light collection processing unit 33.

For example, in a case where the light collection process at the light collection processing unit 33 is performed with images captured by the image capturing device 11 but without any interpolation image, the image processing device 12 can be configured without the interpolation unit 32. However, in a case where the light collection process is performed not only with captured images but also with interpolation images, ringing can be prevented from appearing in an unfocused object in the processing result image.

Further, in a case where parallax information about captured images of a plurality of viewpoints captured by the image capturing device 11 can be generated by an external device using a distance sensor or the and the parallax information can be acquired from the external device, for example, the image processing device 12 can be configured without the parallax information generation unit 31.

Furthermore, in a case where the light collection processing unit 33 sets the in-focus plane and the correction coefficients for the respective viewpoints in accordance with predetermines rules, for example, the image processing device 12 can be configured without the parameter setting unit 34.

<Generation of Interpolation Images>

Figure 6:
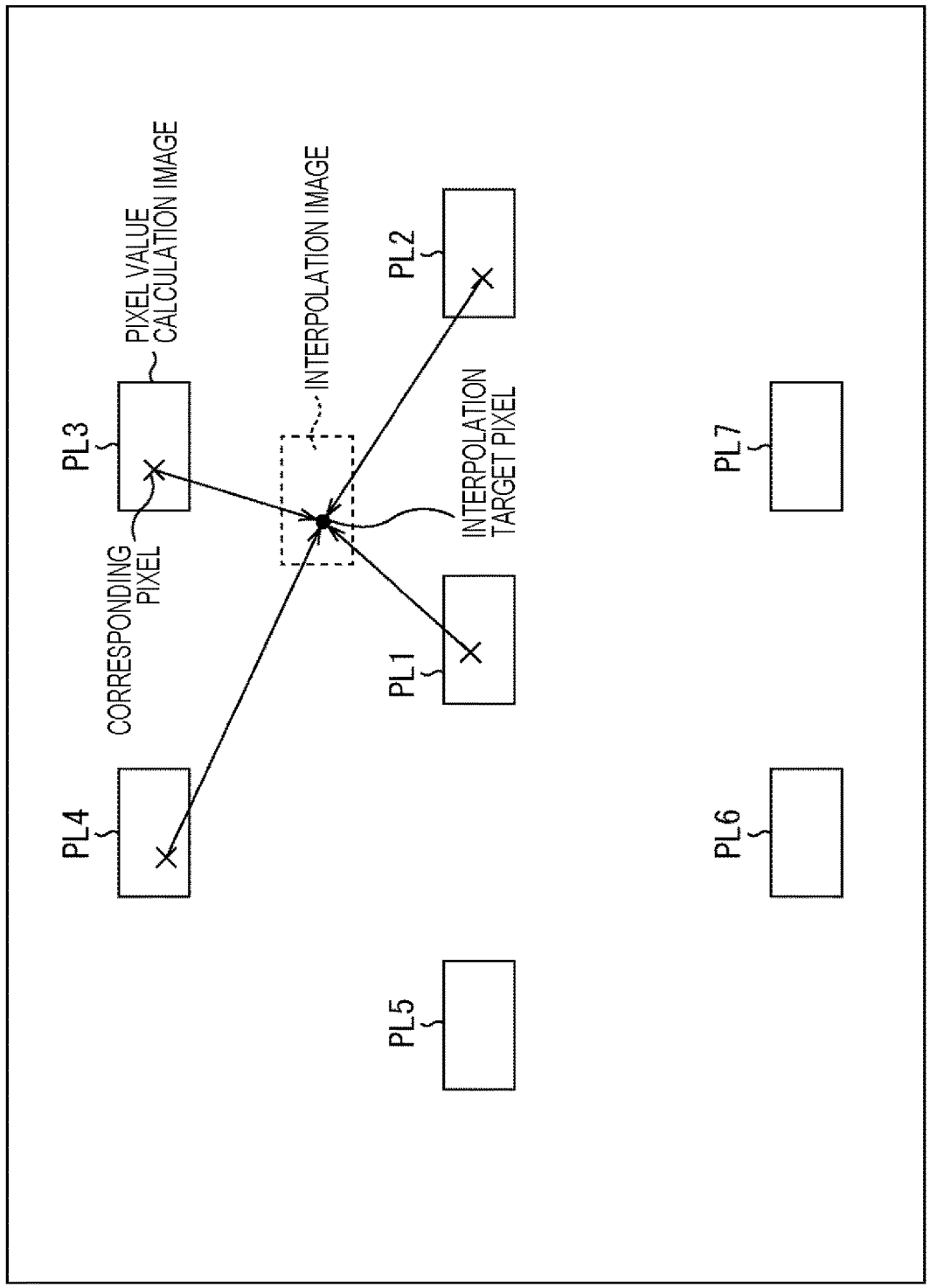
FIG. 6 is a diagram for explaining an example of generation of an interpolation image at an interpolation unit 32.

FIG. 6 is a diagram for explaining an example of generation of an interpolation image at the interpolation unit 32 shown in FIG. 4.

In a case where an interpolation image of a certain viewpoint is to be generated, the interpolation unit 32 sequentially selects a pixel of the interpolation image as an interpolation target pixel for interpolation. The interpolation unit 32 further selects pixel value calculation images to be used in calculating the pixel value of the interpolation target pixel. The pixel value calculation images may be all of the captured images PL1 through PL7 of the seven viewpoints, or the captured images PL#i of some viewpoints close to the viewpoint of the interpolation image. Using the disparity map from the parallax information generation unit 31 and the viewpoint of the interpolation image, the interpolation unit 32 determines the pixel (the pixel showing the same spatial point as the spatial point shown on the interpolation target pixel, if image capturing is performed from the viewpoint of the interpolation image) corresponding to the interpolation target pixel from each of the captured images PL#i of a plurality of viewpoints selected as the pixel value calculation images.

The interpolation unit 32 then weights the pixel value of the corresponding pixel, and determines the resultant weighted value to be the pixel value of the interpolation target pixel.

The weight used for the weighting of the pixel value of the corresponding pixel may be a value that is inversely proportional to the distance between the viewpoint of the captured image PL#i as the pixel value calculation image having the corresponding pixel and the viewpoint of the interpolation image having the interpolation target pixel.

Note that, in a case where intense light with directivity is reflected on the captured images PL#i, it is preferable to select captured images PL#i of some viewpoints such as three or four viewpoints as the pixel value calculation images, rather than selecting all of the captured images PL1 through PL7 of the seven viewpoints as the pixel value calculation images. With captured images PL#i of some of the viewpoints, it is possible to obtain an interpolation image similar to an image that would be obtained if image capturing is actually performed from the viewpoint of the interpolation image.

<Generation of a Disparity Map>

Figure 7:
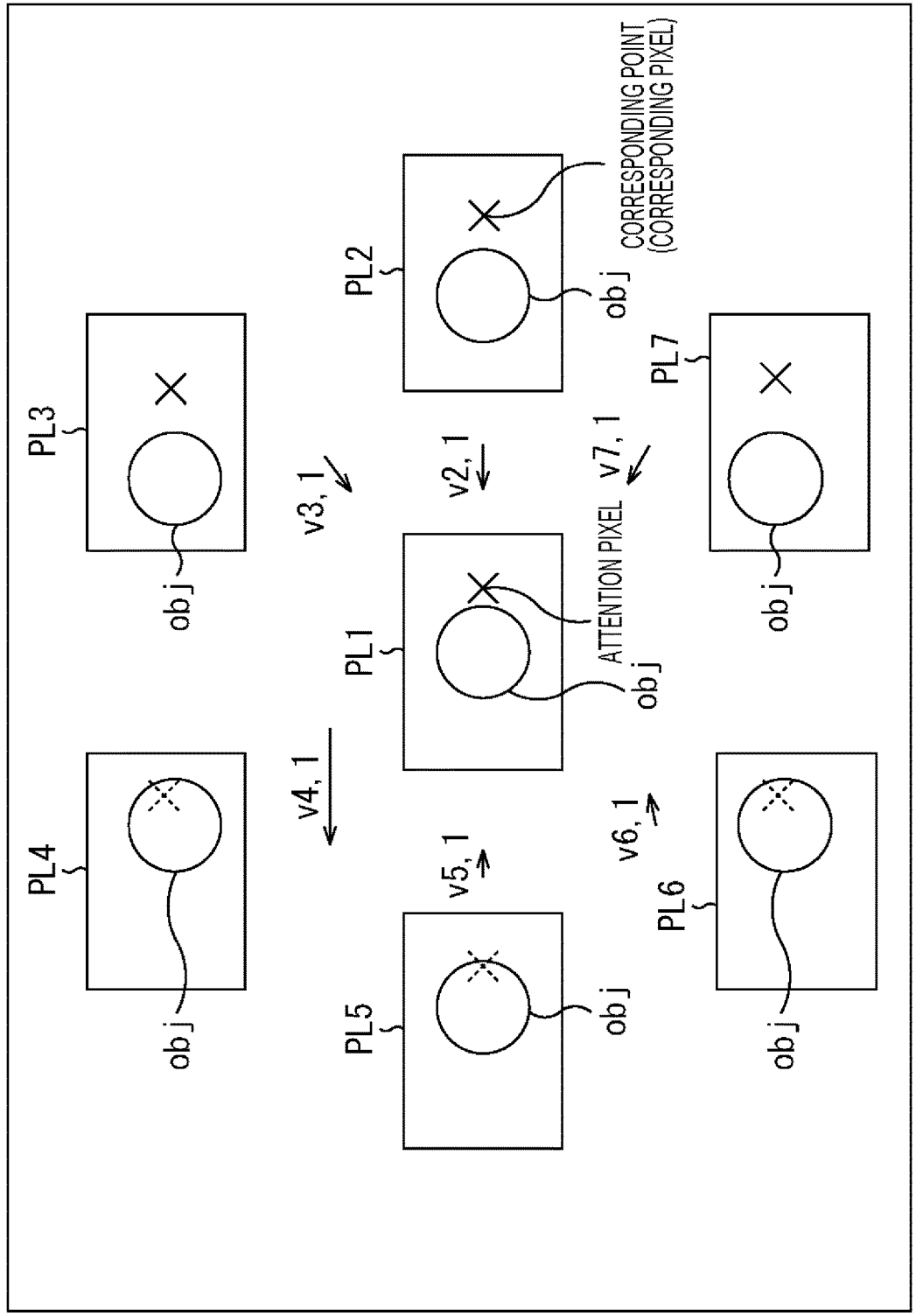
FIG. 7 is a diagram for explaining an example of generation of a disparity map at a parallax information generation unit 31.

FIG. 7 is a diagram for explaining an example of generation of a disparity map at the parallax information generation unit 31 shown in FIG. 4.

In other words, FIG. 7 shows an example of captured images PL1 through PL7 captured by the cameras $21_1$ through $21_7$ of the image capturing device 11.

In FIG. 7, the captured images PL1 through PL7 show a predetermined object obj as the foreground in front of a predetermined background. Since the captured images PL1 through PL7 have different viewpoints from one another, the positions (the positions in the captured images) of the object obj shown in the respective captured images PL2 through PL7 differ from the position of the object obj shown in the captured image PL1 by the amounts equivalent to the viewpoint differences, for example.

Here, the viewpoint (position) of a camera $21_i$, or the viewpoint of a captured image PL#i captured by a camera $21_i$, is represented by vp#i.

For example, in a case where a disparity map of the viewpoint vp1 of the captured image PL1 is to be generated, the parallax information generation unit 31 sets the captured image PL1 as the attention image PL1 to which attention is paid. The parallax information generation unit 31 further sequentially selects each pixel of the attention image PL1 as the attention pixel to which attention is paid, and detects the corresponding pixel (corresponding point) corresponding to the attention pixel from each of the other captured images PL2 through PL7.

The method of detecting the pixel corresponding to the attention pixel of the attention image PL1 from each of the captured images PL2 through PL7 may be a method utilizing the principles of triangulation, such as stereo matching or multi-baseline stereo, for example.

Here, the vector representing the positional shift of the corresponding pixel of a captured image PL#i relative to the attention pixel of the attention image PL1 is set as a disparity vector v#i, 1.

The parallax information generation unit 31 obtains disparity vectors v2, 1 through v7, 1 for the respective captured images PL2 through PL7. The parallax information generation unit 31 then performs a majority decision on the magnitudes of the disparity vectors v2, 1 through v7, 1, for example, and sets the magnitude of the disparity vectors v#i, 1, which are the majority, as the magnitude of the disparity (at the position) of the attention pixel.

Here, in a case where the distance between the reference camera $21_1$ for capturing the attention image PL1 and each of the peripheral cameras $21_2$ through $21_7$ for capturing the captured images PL2 through PL7 is the same distance of B in the image capturing device 11 as described above with reference to FIG. 2, when the real-space point shown in the attention pixel of the attention image PL1 is also shown in the captured images PL2 through PL7, vectors that differ in orientation but are equal in magnitude are obtained as the disparity vectors v2, 1 through v7, 1.

In other words, the disparity vectors v2, 1 through v7, 1 in this case are vectors that are equal in magnitude and are in the directions opposite to the directions of the viewpoints vp2 through vp7 of the other captured images PL2 through PL7 relative to the viewpoint vp1 of the attention image PL1.

However, among the captured images PL2 through PL7, there may be an image with occlusion, or an image in which the real-space point appearing in the attention pixel of the attention image PL1 is hidden behind the foreground.

From a captured image PL#i that does not show the real-space point shown in the attention pixel of the attention image PL1 (this captured image PL#i will be hereinafter also referred to as the occlusion image), at is difficult to correctly detect the pixel corresponding to the attention pixel.

Therefore, regarding the occlusion image PL#i, a disparity vector v#i, 1 having a different, magnitude from the disparity vectors v#i, 1 of the captured images PL#j showing the real-space point shown in the attention pixel of the attention image PL1 is obtained.

Among the captured images PL2 through PL7, the number of images with occlusion with respect to the attention pixel is estimated to be smaller than the number of images with no occlusion. In view of this, the parallax information generation unit 31 performs a majority decision on the magnitudes of the disparity vectors v2, 1 through v7, 1, and sets the magnitude of the disparity vectors v#i, 1, which are the majority, as the magnitude of the disparity of the attention pixel, as described above.

In FIG. 7, among the disparity vectors v2, 1 through v7, 1, the three disparity vectors v2, 1, v3, 1, and v7, 1 are vectors of the same magnitude. Meanwhile, there are no disparity vectors of the same magnitude among the disparity vectors v4, 1, v5, 1, and v6, 1.

Therefore, the magnitude of the three disparity vectors v2, 1, v3, 1, and v7, 1 are obtained as the magnitude of the disparity of the attention pixel.

Note that the direction of the disparity between the attention pixel of the attention image PL1 and any captured image PL#i can be recognized from the positional relationship (such as the direction from the viewpoint vp1 toward the viewpoint vp#i) between the viewpoint vp1 of the attention image PL1 (the position of the camera $21_1$) and the viewpoint vp#i of the captured image PL#i (the position of the camera $21_i$).

The parallax information generation unit 31 sequentially selects each pixel of the attention image PL1 as the attention pixel, and determines the magnitude of the disparity. The parallax information generation unit 31 then generates, as a disparity map, a map in which the magnitude of the disparity of each pixel of the attention image PL1 is registered with respect to the position (x-y coordinate) of the pixel. Accordingly, the disparity map is a map (table) in which the positions of the pixels are associated with the disparity magnitudes of the pixels.

The disparity maps of the viewpoints vp#i of the other captured images PL#i can also be generated like the disparity map of the viewpoint vp#1.

However, in the generation of the disparity maps of the viewpoints vp#i other than the viewpoint vp#1, the majority decisions are performed on the disparity vectors, after the magnitudes of the disparity vectors are adjusted on the basis of the positional relationship between the viewpoint vp#i of a captured image PL#i and the viewpoints vp#j of the captured images PL#j other than the captured image PL#i (the positional relationship between the cameras $21_i$ and $21_j$) (the distance between the viewpoint vp#i and the viewpoint vp#j).

In other words, in a case where the captured image PL5 is set as the attention image PL5, and disparity maps are generated with respect to the image capturing device 11 shown in FIG. 2, for example, the disparity vector obtained between the attention image PL5 and the captured image PL2 is twice greater than the disparity vector obtained between the attention image PL5 and the captured. image PL1.

This is because, while the baseline length that is the distance between the optical axes of the camera $21_5$ for capturing the attention image PL5 and the camera $21_1$ for capturing the captured image PL1 is the distance of B, the baseline length between the camera $21_5$ for capturing the attention image PL5 and the camera $21_2$ for capturing the captured image PL2 is the distance of 2B.

In view of this, the distance of B, which is the baseline length between the reference camera $21_1$ and the other cameras $21_1$, for example, is referred to as the reference baseline length, which is the reference in determining a disparity. A majority decision on disparity vectors is performed after the magnitudes of the disparity vectors are adjusted so that the baseline lengths can be converted into the reference baseline length of B.

In other words, since the baseline length of B between the camera $21_5$ for capturing the captured image PL5 and the reference camera $21_1$ for capturing the captured image PL1 is equal to the reference baseline Length B, for example, the magnitude of the disparity vector to be obtained between the attention image PL5 and the captured image PL1 is adjusted to a magnitude that is one time greater.

Further, since the baseline length of 2B between the camera $21_5$ for capturing the attention image PL5 and the camera $21_2$ for capturing the captured image PL2 is equal to twice the reference baseline length of B, for example, the magnitude of the disparity vector to be obtained between the attention image PL5 and the captured image PL2 is adjusted to a magnification that is ½ greater (a value multiplied by the ratio between the reference baseline length B and the baseline length of 2B between the camera $21_5$ and the camera $21_2$).

Likewise, the magnitude of the disparity vector to be obtained between the attention image PL5 and another captured image PL#i is adjusted to a magnitude multiplied by the ratio to the reference baseline length of B.

A disparity vector majority decision is then performed with the use of the disparity vectors subjected to the magnitude adjustment.

Note that, in the parallax information generation unit 31, the disparity of (each of the pixels of) a captured image PL#i can be determined with the precision of the pixels of the captured images captured by the image capturing device 11, for example. Alternatively, the disparity of a captured image PL#i can be determined with a precision equal to or lower than that of pixels having a higher precision than the pixels of the captured image PL#i (for example, the precision of sub pixels such as ¼ pixels).

In a case where a disparity is to be determined with the pixel precision or lower, the disparity with the pixel precision or lower can be used as it is in a process using disparities, or the disparity with the pixel precision or lower can be used after being rounded down, rounded up, or rounded off to the closest whole number, for example.

Here, the magnitude of a disparity registered in the disparity map is hereinafter also referred to as a registered disparity. For example, in a case where a vector as a disparity in a two-dimensional coordinate system in which the axis extending in a rightward direction is the x-axis while the axis extending in a downward direction is the y-axis, a registered disparity is equal to the x component of the disparity between each pixel of the reference image PL1 and the captured image PL5 of the viewpoint to the left of the reference image PL1 (or the x component of the vector representing the pixel shift from a pixel of the reference image PL1 to the corresponding pixel of the captured image PL5, the corresponding pixel corresponding to the pixel of the reference image PL1).

<Refocusing Through a Light Collection Process>

Figure 8:
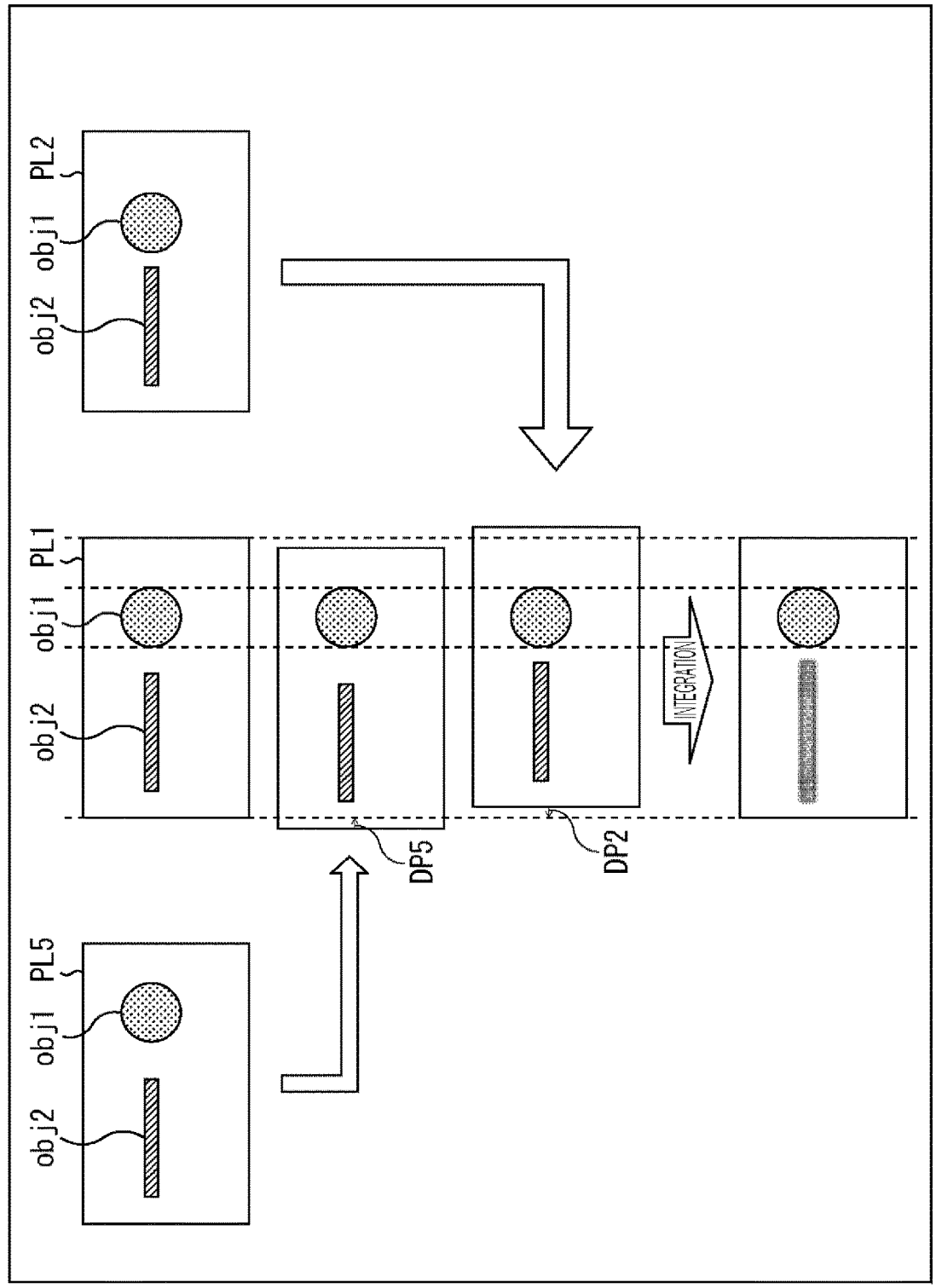
FIG. 8 is a diagram for explaining an outline of refocusing through a light collection process to be performed by a light collection processing unit 33.

FIG. 8 is a diagram for explaining an outline of refocusing through a light collection process to be performed by the light collection processing unit 33 shown in FIG. 4.

Note that, for ease of explanation, the three images, which are the reference image PL1, the captured image PL2 of the viewpoint to the right of the reference image PL1, and the captured image PL5 of the viewpoint to the left of the reference image PL1, are used as the viewpoint images of a plurality of viewpoints for the light collection process in FIG. 8.

In FIG. 8, two objects obj1 and obj2 are shown in the captured images PL1, PL2, and PL5. For example, the object obj1 is located on the near side, and the object obj2 is on the far side.

For example, refocusing is performed to focus on (or put the focus on) the object obj1 at this stage, so that an image viewed from the reference viewpoint of the reference image PL1 is obtained as the post-refocusing processing result image.

Here, DP1 represents the disparity of the viewpoint of the processing result image with respect to the pixel showing the object obj1 of the captured image PL1, or the disparity (of the corresponding pixel of the reference image PL1) of the reference viewpoint in this case. Likewise, DP2 represents the disparity of the viewpoint of the processing result, image with respect, to the pixel showing the object obj1 of the captured image PL2, and DP5 represents the disparity of the viewpoint of the processing result image with respect to the pixel showing the object obj1 of the captured image PL5.

Note that, since the viewpoint of the processing result image is equal to the reference viewpoint of the captured image PL1 in FIG. 8, the disparity DP1 of the viewpoint of the processing result image with respect to the pixel showing the object obj1 of the captured image PL1 is (0, 0).

As for the captured images PL1, PL2, and PL5, pixel shift is performed on the captured images PL1, PL2, and PL5 in accordance with the disparities DP1, DP2, and DP5, respectively, and the captured images PL1 and PL2, and PL5 subjected to the pixel shift are integrated. In this manner, the processing result image focused on the object obj1 can be obtained.

In other words, pixel shift is performed on the captured images PL1, PL2, and PL5 so as to cancel the disparities DP1, DP2, and DP5 (the pixel shift being in the opposite direction from the disparities DP1, DP2, and DP5). As a result, the positions of the pixels showing the object obj1 match among the captured images PL1, PL2, and PL5 subjected to the pixel shift.

As the captured images PL1, PL2, and PL5 subjected to the pixel shift are integrated in this manner, the processing result image focused on the object obj1 can be obtained.

Note that, among the captured images PL1, PL2, and PL5 subjected to the pixel shift, the positions of the pixels showing the object obj2 located at a different position from the object obj1 in the depth direction are not the same. Therefore, the object obj2 shown in the processing result image is blurry.

Furthermore, since the viewpoint of the processing result image is the reference viewpoint, and the disparity DP1 is (0, 0) as described above, there is no substantial need to perform pixel shift on the captured image PL1.

In the light collection process by the light collection processing unit 33, the pixels of viewpoint images of a plurality of viewpoints are subjected to pixel shift so as to cancel the disparity of the viewpoint (the reference viewpoint in this case) of the processing result image with respect to the focus target pixel showing the focus target, and are then integrated, as described above, for example. Thus, an image subjected to refocusing for the focus target is obtained as the processing result image.

<Disparity Conversion>

Figure 9:
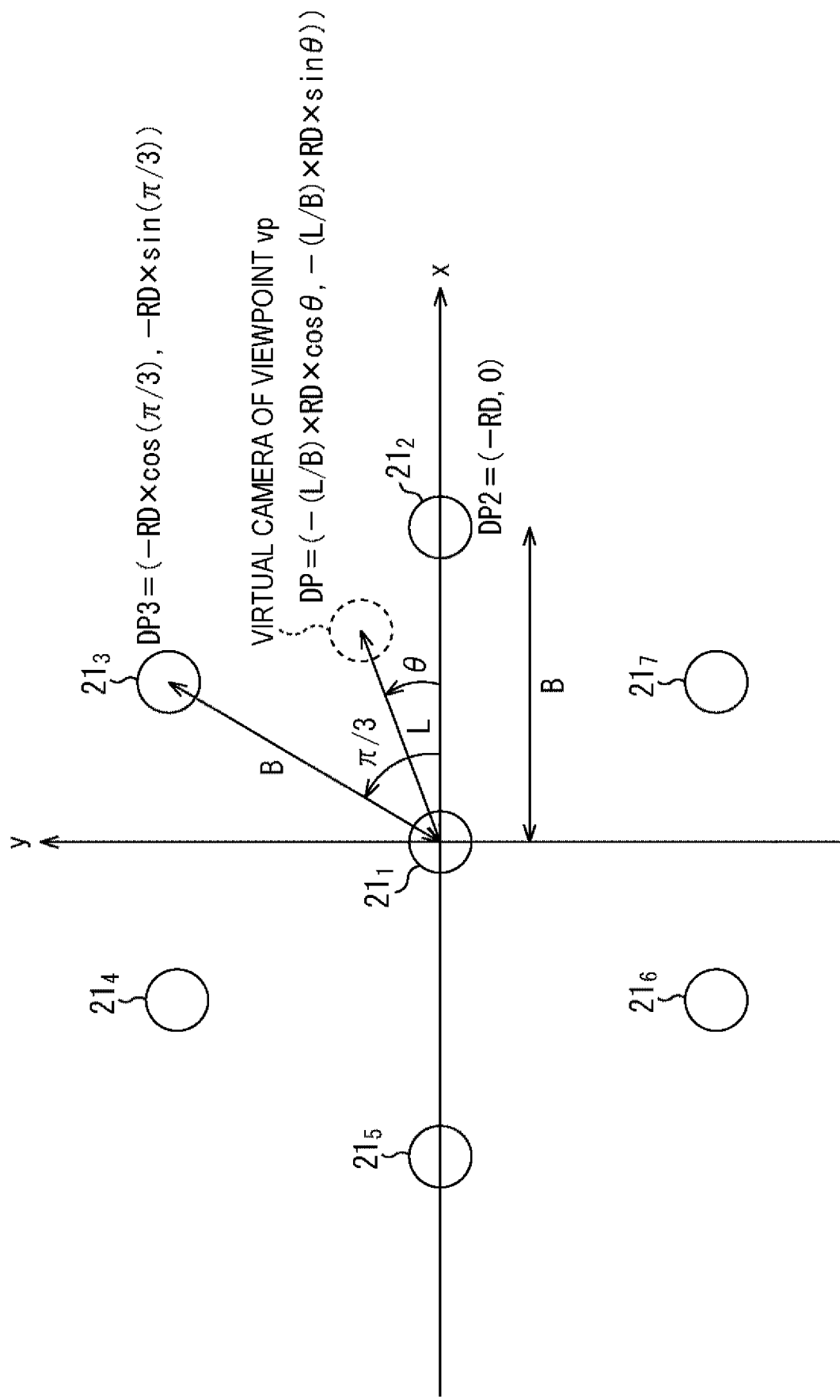
FIG. 9 is a diagram for explaining an example of disparity conversion.

FIG. 9 is a diagram for explaining an example of disparity conversion.

As described above with reference to FIG. 7, the registration disparities registered in a disparity map are equivalent to the x components of the disparities of the pixels of the reference image PL1 with respect to the respective pixels of the captured image PL5 of the viewpoint to the left of the reference image PL1.

In refocusing, it is necessary to perform pixel shift on each viewpoint image so as to cancel the disparity of the focus target pixel.

Attention is now drawn to a certain viewpoint as the attention viewpoint. In this case, the disparity of the focus target pixel of the processing result image with respect to the viewpoint image of the attention viewpoint, or the disparity of the focus target pixel of the reference image PL1 of the reference viewpoint in this case, is required in pixel shift of the captured image of the attention viewpoint, for example.

The disparity of the focus target pixel of the reference image PL1 with respect to viewpoint image of the attention viewpoint can be determined from the registered disparity of the focus target pixel of the reference image PL1 (the corresponding pixel of the reference image PL corresponding to the focus target pixel of the processing result image), with the direction from the reference viewpoint (the viewpoint of the processing result image) toward the attention viewpoint being taken into account.

Here, the direction from the reference viewpoint toward the attention viewpoint is indicated by a counterclockwise angle, with the x-axis being 0 [radian].

For example, the camera $21_2$ is located at a distance equivalent to the reference baseline length of B in the +x direction, and the direction from the reference viewpoint toward the viewpoint of the camera $21_2$ is 0 [radian]. In this case, (the vector as) the disparity DP2 of the focus target pixel of the reference image PL1 with respect to the viewpoint image (the captured image PL2) at the viewpoint of the camera $21_2$ can be determined to be $(-RD, 0)=(-(B/B)\times RD\times\cos 0, -(B/B)\times RD\times\sin 0)$ from the registered disparity RD of the focusing target pixel, as 0 [radian] is the direction of the viewpoint of the camera $21_2$.

Meanwhile, the camera $21_3$ is located at a distance equivalent to the reference baseline length of B in the n/3 direction, for example, and the direction from the reference viewpoint toward the viewpoint of the camera $21_2$ is n/3 [radian]. In this case, the disparity DP3 of the focus target pixel of the reference image PL1 with respect to the viewpoint image (the captured image PL3) of the viewpoint of the camera $21_3$ can be determined to be $(-RD\times\cos(n/3), -RD\times\sin(n/3))=(-(B/B)\times RD\times\cos(n/3), -(B/B)\times RD\times\sin(n/3))$ from the registered disparity RD of the focus target pixel, as the direction of the viewpoint of the camera $21_3$ is n/3 [radian].

Here, an interpolation image obtained by the interpolation unit 32 can be regarded as an image captured by a virtual camera located at the viewpoint vp of the interpolation image. The viewpoint vp of this virtual camera is assumed to be located at a distance L from the reference viewpoint in the direction of the angle θ [radian]. In this case, the disparity DP of the focus target pixel of the reference image PL1 with respect to the viewpoint image of the viewpoint vp (the image captured by the virtual camera) can be determined to be $(-(L/B)\times RD\times\cos\theta, -(L/B)\times RD\times\sin\theta)$ from the registered disparity RD of the focus target pixel, as the direction of the viewpoint vp is the angle θ.

Determining the disparity of a pixel of the reference image PL1 with respect to the viewpoint image of the attention viewpoint from a registered disparity RD and the direction of the attention viewpoint as described above, or converting a registered disparity RD into the disparity of a pixel of the reference image PL1 (the processing result image) with respect to the viewpoint image of the attention viewpoint, is also called disparity conversion.

In refocusing, the disparity of the focus target pixel of the reference image PL1 with respect to the viewpoint image of each viewpoint is determined from the registered disparity RD of the focus target pixel through disparity conversion, and pixel shift is performed on the viewpoint images of the respective viewpoints so as to cancel the disparity of the focus target pixel.

In refocusing, pixel shift is performed on a viewpoint image so as to cancel the disparity of the focus target pixel with respect to the viewpoint image, and the shift amount of this pixel shift is also referred to as the focus shift amount.

Here, in the description below, the viewpoint of the ith viewpoint image among the viewpoint images of a plurality of viewpoints obtained by the interpolation unit 32 is also written as the viewpoint vp#i. The focus shift amount of the viewpoint image of the viewpoint vp#i is also written as the focus shift amount DP#i.

The focus shift amount DP#i of the viewpoint image of the viewpoint vp#i can be uniquely determined from the registered disparity RD of the focus target pixel through disparity conversion taking into account the direction from the reference viewpoint toward the viewpoint vp#i.

Here, in the disparity conversion, (the vector as) a disparity $(-(L/B)\times RD\times\cos\theta, -(L/B)\times RD\times\sin\theta)$ is calculated from the registered disparity RD, as described above.

Accordingly, the disparity conversion can be regarded as an operation to multiply the registered disparity RD by $-(L/B)\times\cos\theta$ and $-(L/B)\times\sin\theta$, or as an operation to multiply the registered disparity RD×−1 by $(L/B)\times\cos\theta$ and $(L/B)\times\sin\theta$, or the like, for example.

Here, the disparity conversion can be regarded as an operation to multiply the registered disparity RD×−1 by $(L/B)\times\cos\theta$ and $(L/B))\times\sin\theta$, for example.

In this case, the value to be subjected to the disparity conversion, which is the registered disparity RD×−1, is the reference value for determining the focus shift amount of the viewpoint image of each viewpoint, and will be hereinafter also referred to as the reference shift amount BV.

The focus shift amount is uniquely determined through disparity conversion of the reference shift amount BV. Accordingly, the pixel shift amount for performing pixel shift on the pixels of the viewpoint image or each viewpoint in refocusing is substantially set depending on the setting of the reference shift. amount BV.

Note that, in a case where the registered disparity RD×−1 is adopted as the reference shift amount BV as described above, the reference shift amount BV at a time when the focus target pixel is focused, or the registered disparity RD of the focus target pixel×−1, is equal to the x component of the disparity of the focus target pixel with. respect to the captured image PL2.

<Light Collection Process>

Figure 10:
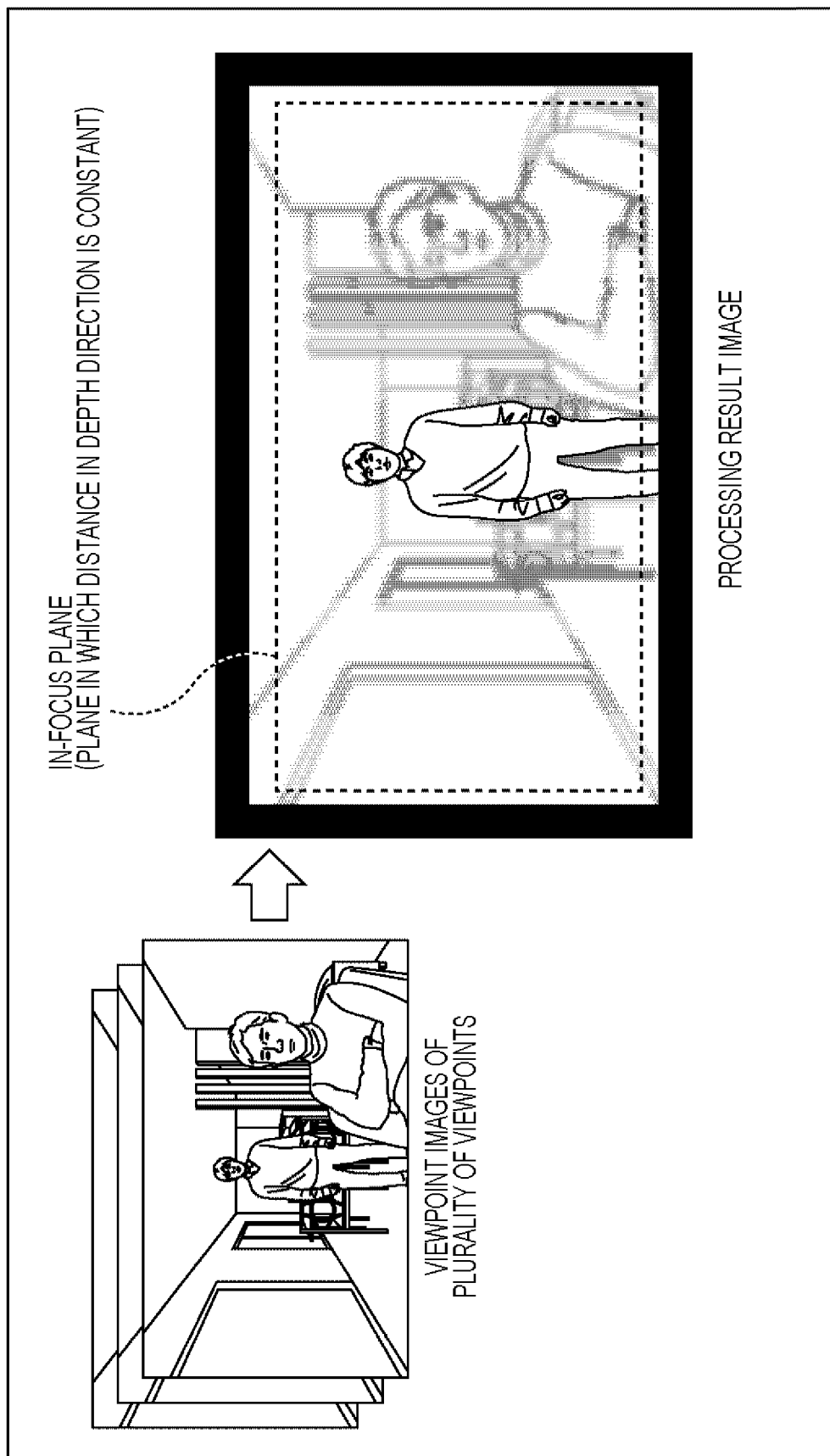
FIG. 10 is a diagram for explaining an outline of refocusing through a light collection process

FIG. 10 is a diagram for explaining an outline of refocusing through a light collection process Here, a plane formed with a group of in-focus points (in-focus real-space points in the real space) is set as an in-focus plane.

In a light collection process, refocusing is performed by setting an in-focus plane that is a plane in which the distance in the depth. direction in the real space is constant (does not vary), for example, and generating a processing result image focused on an object located on the in-focus plane (or in the vicinity of the in-focus plane), using viewpoint images of a plurality of viewpoints.

In FIG. 10, one person is shown in the near side while another person is shown in the middle in each of the viewpoint images of the plurality of viewpoints. Further, a plane that passes through the position of the person in the middle and is at a constant distance in the depth direction is set as the in-focus lane, and a processing result image focused on an object on the in-focus plane, or the person in the middle, for example, is obtained from the viewpoint images of the plurality of viewpoints.

Note that the in-focus plane may be a plane or a curved plane whose distance in the depth direction in the real space varies, for example. Alternatively, the in-focus plane may be formed with a plurality of planes or the like at different distances in the depth direction.

Figure 11:
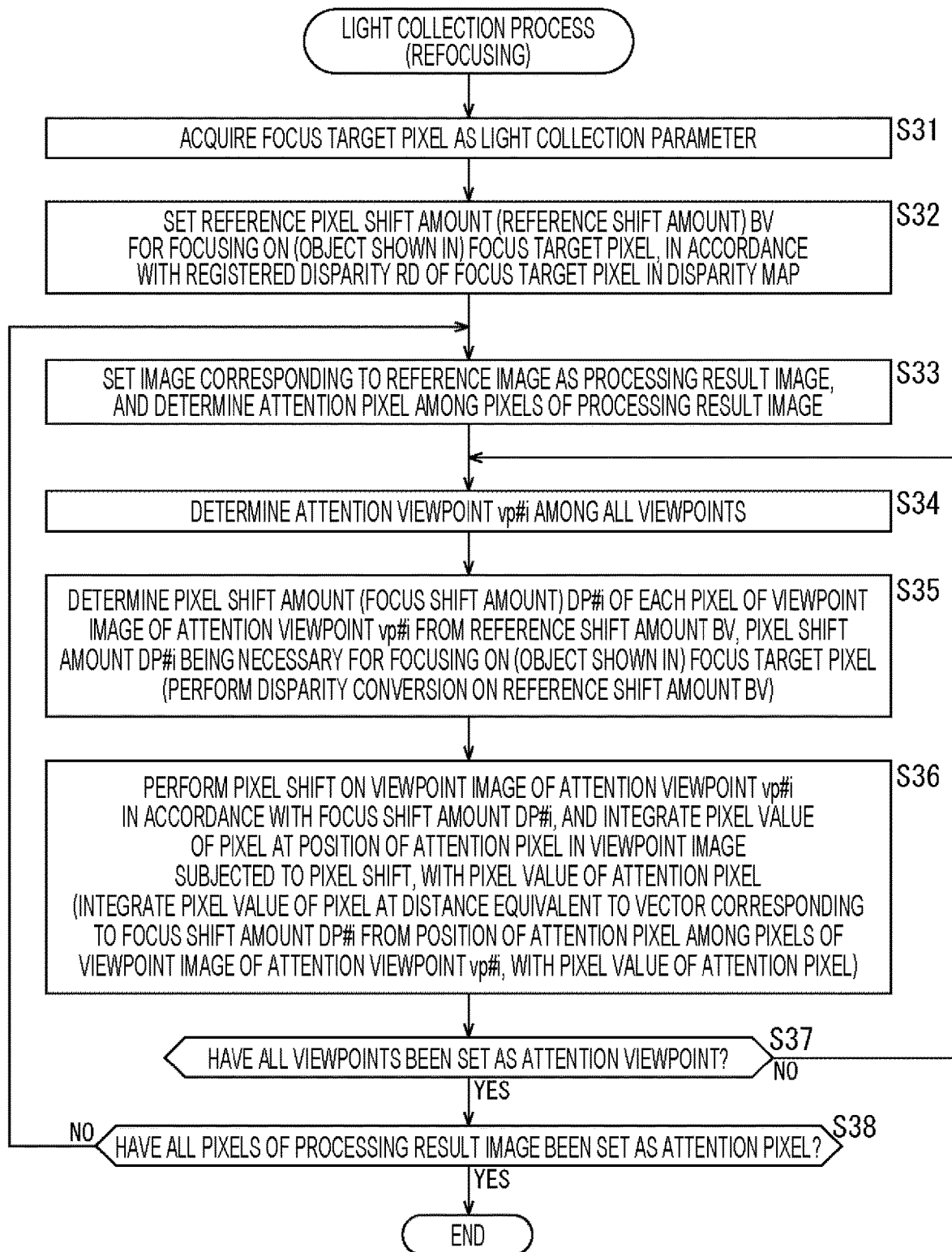
FIG. 11 is a flowchart for explaining an example of a light collection process to be performed by the light collection processing unit 33.

FIG. 11 is a flowchart for explaining an example of a light collection process to be performed by the light collection processing unit 33.

In other words, FIG. 11 is a flowchart showing an example of a light collection process to be performed in a case where blurring is not caused in an entire image.

In step S31, the light collection processing unit 33 acquires (information about) the focus target pixel serving as a light collection parameter from the parameter setting unit 34, and the process then moves on to step S32.

Specifically, the reference image PL1 or the like among the captured images PL1 through PL7 captured by the cameras 21$_1$ through 21$_7$ is displayed on the display device 13, for example. When the user designates a position in the reference image PL1, the parameter setting unit 34 sets the pixel at the position designated by the user as the focus target pixel, and supplies (information indicating) the focus target pixel as a light collection parameter to the light collection. processing unit 33.

In step S31, the light collection processing unit 33 acquires the focus target pixel supplied from the parameter setting unit 34 as described above.

In step S32, the light collection processing unit 33 acquires the registered disparity RD of the focus target pixel registered in a disparity map supplied from the parallax information generation unit 31. The light collection processing unit 33 then sets the reference shift amount DV in accordance with the registered disparity RD of the focus target pixel, or sets the registered disparity RD of the focus target pixelx−1as the reference shift amount DV, for example. The process then moves from step S32 on to step S33.

In step S33, the light collection processing unit 33 sets a processing result image that is an image corresponding to one of viewpoint images of a plurality of viewpoints supplied from the interpolation unit 32, such as an image corresponding to the reference image, or an image that has the same size as the reference image and has 0 as the initial value of the pixel value as viewed from the viewpoint of the reference image, for example. The light collection processing unit 33 further determines the attention pixel that is one of the pixels that are of the processing result image and have not been selected as the attention pixel. The process then moves from step S33 on to step S34.

In step S34, the light collection processing unit 33 determines the attention viewpoint vp#i to be one viewpoint vp#i that has not been determined to be the attention viewpoint (with respect to the attention pixel) among the viewpoints of the viewpoint images supplied from the interpolation unit 32. The process then moves on to step S35.

In step S35, the light collection processing unit 33 determines the focus shift amounts DP#i of the respective pixels of the viewpoint image of the attention viewpoint vp#i, from the reference shift amount BV. The focus shift amounts DP#i are necessary for focusing on the focus target pixel (put the focus on the object shown in the focus target pixel).

In other words, the light collection processing unit 33 performs disparity conversion on the reference shift amount BV by taking into account the direction from the reference viewpoint toward the attention viewpoint vp#i, and acquires the values (vectors) obtained through the disparity conversion as the focus shift amounts DP#i of the respective pixels of the viewpoint image of the attention viewpoint vp#i.

After that, the process moves from step S35 on to step S36. The light collection processing unit 33 then performs pixel shift on the respective pixels of the viewpoint image of the attention viewpoint vp#i in accordance with the focus shift amount DP#i, and integrates the pixel value of the pixel at the position of the attention pixel in the viewpoint image subjected to the pixel shift, with the pixel value of the attention pixel.

In other words, the light collection processing unit 33 integrates the pixel value of the pixel at a distance equivalent to the vector (for example, the focus shift amount. DP#ix−1 in this case) corresponding to the focus shift amount DP#i from the position of the attention pixel among the pixels of the viewpoint image of the attention viewpoint vp#i, with the pixel value of the attention pixel.

The process then moves from step S36 on to step S37, and the light collection processing unit 33 determines whether or not all the viewpoints of the viewpoint images supplied from the interpolation unit 32 have been set as the attention viewpoint.

If it is determined in step S37 that not all the viewpoints of the viewpoint images from the interpolation unit 32 have been set as the attention viewpoint, the process returns to step S34, and thereafter, a process similar to the above is repeated.

If it is determined in step 837 that all the viewpoints of the viewpoint images from the interpolation unit 32 have been set as the attention viewpoint, on the other hand, the process moves on to step S38.

In step S38, the light collection processing unit 33 determines whether or not all of the pixels of the processing result image have been set as the attention pixel.

If it is determined in step S38 that not all of the pixels of the processing result image have been set as the attention pixel, the process returns to step S33, and the light collection processing unit 33 newly determines the attention pixel that is one of the pixels that are of the processing result image and have not, been determined to be the attention pixel. After that, a process similar to the above is repeated.

If it is determined in step S38 that all the pixels of the processing result image have been set as the attention pixel, on the other hand, the light collection processing unit 33 outputs the processing result image, and ends the light collection process.

Note that, in the light collection process shown in FIG. 11, the reference shift amount BV is set in accordance with the registered disparity RD of the focus target pixel, and varies neither with the attention pixel nor with the attention viewpoint vp#i. In view of this, the reference shift amount BV is set, regardless of the attention pixel and the attention viewpoint vp#i.

Meanwhile, the focus shift amount DP#i varies with the attention viewpoint vp#i and the reference shift amount BV. In a simple refocusing mode, however, the reference shift amount BV varies neither with the attention pixel nor with the attention viewpoint vp#i, described above. Accordingly, the focus shift amount DP#i varies with the attention viewpoint vp#i, but does not vary with the attention pixel. In other words, the focus shift amount DP#i has the same value for each pixel of the viewpoint image of one viewpoint, irrespective of the attention pixel.

In FIG. 11, the process in step S35 for obtaining the focus shift amount DP#i forms a loop for repeatedly calculating the focus shift amount DP#i for the same viewpoint vp#, regarding different attention pixels (the loop from step S33 to step S38). However, as described above, the focus shift amount DP#i has the same value for each pixel of a viewpoint image of one viewpoint, regardless of the attention pixel.

Therefore, in FIG. 11, the process in step S35 for obtaining the focus shift amount DP#i is performed only once for one viewpoint.

In the light collection process shown in FIG. 11, the plane having a constant distance in the depth direction is set as the in-focus plane, as described above with reference to FIG. 10. Accordingly, the reference shift amount. By of the viewpoint image necessary for focusing on the focus target pixel has such a value as to cancel the disparity of the focus target pixel showing a spatial point on the in-focus plane having the constant distance in the depth direction, or the disparity of the focus target pixel whose disparity is the value corresponding to the distance to the in-focus plane.

Therefore, in the light collection process shown in FIG. 11, the reference shift amount BV depends neither on a pixel (attention pixel pixel) of the processing result image nor on the viewpoint (attention viewpoint) of a viewpoint image in which the pixel values are integrated, and accordingly, does not need to be set for each pixel of the processing result image or each viewpoint of the viewpoint images (even if the reference shift amount BV is set for each pixel of the processing result image or each viewpoint of the viewpoint images, the reference shift amount BV is set at the same value, and accordingly, is not actually set for each pixel of the processing result image or each viewpoint of the viewpoint images).

Note that, in FIG. 11, pixel shift and integration of the pixels of the viewpoint images are performed for each pixel of the processing result image. In the light collection process, however, pixel shift and integration of the pixels of the viewpoint images can be performed for each subpixel obtained by finely dividing each pixel of the processing result image, other than for each pixel of the processing result image.

Further, in the light collection process shown in FIG. 11, the attention pixel loop (the loop from step S33 to step S38) is on the outer side, and the attentional viewpoint loop (the loop from step S34 to step S37) is on the inner side. However, the attention viewpoint loop can be the outer-side loop while the attention pixel loop is the inner-side loop.

<Correction Coefficients>

Figure 12:
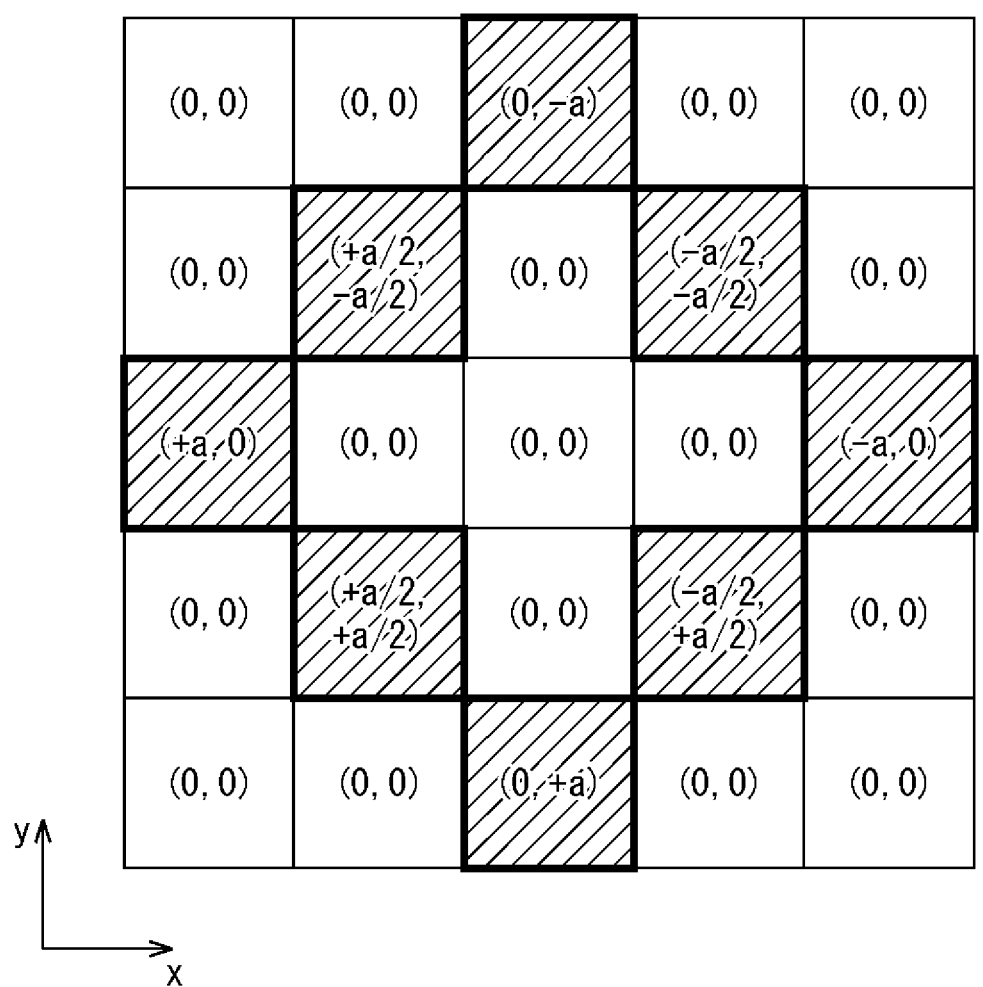
FIG. 12 is a diagram showing an example of correction coefficients for respective viewpoints

FIG. 12 is a diagram showing an example of correction coefficients for the respective viewpoints Here, in a case where image capturing is performed with an actual single lens camera or the like, a soft (focus) filter that is mounted in front of the lens can provide an entire image with slights blurring (soft blurring like blurred light).

With correction coefficients for the respective viewpoints, it is possible to perform refocusing accompanied by blurring similar to the blurring to be realized with a soft filter.

FIG. 12 shows an example of correction coefficients for the respective viewpoints for producing the filter effect of a soft filter.

Here, the total number of viewpoints of the viewpoint images obtained by the interpolation unit 32 is assumed to be $M^2$=25 (5×5): M(=5) viewpoints in the horizontal direction and M viewpoints in the vertical direction.

The correction coefficients for the respective viewpoints of the M×M viewpoints can he designed as coefficients arranged in an M×M array, for example.

In this case, of the coefficients arranged in the M×M array, the coefficient that is the xth coefficient from the left and the yth coefficient from the bottom (this coefficient will be hereinafter also referred to as the (x, y)th coefficient) can be set as the correction coefficient for the (x, y) th viewpoint among the viewpoints of the viewpoint images obtained by the interpolation unit 32.

In the soft filter, grooves (irregularities) are formed, for example, and the correction coefficients can be set for the respective viewpoints in accordance with the grooves of the soft filter expected to provide a desired filter effect.

In FIG. 12, to produce the filter effect of the soft filter in which the grooves are concentrically formed, values (other than (0, 0)) equivalent to desired degrees of blurriness are set in the correction coefficients (shaded portions) for the viewpoints in a substantially (concentric) circular form at the positions corresponding to the positions of the grooves or the soft filter, among the M×M viewpoints. Meanwhile, (0, 0) equivalent to no blurriness (the degree of blurriness being 0) is set in the correction coefficients for the other viewpoints.

In FIG. 12, the correction coefficient (p, q) for a certain viewpoint vp#i is a correction amount for correcting the vector as the focus shift amount DP#i. Where the vector as the focus shift amount DP#i is expressed as (sx, sy), the vector as a corrected focus shift amount DP#i obtained by correcting the focus shift amount DP#i with the correction coefficient (p, q) is expressed as (sx+p, sy+q), for example.

With the corrected focus shift amount DP#i corrected with the correction coefficients for the respective viewpoints in FIG. 12, the pixels of the viewpoint images of the viewpoints in a concentric form are subjected to pixel shift that is shorter in distance by the amount equivalent to "a" pixels than the pixel shift according to the original focus shift amount DP#i in the light collection process.

Hereinafter, the viewpoints with the correction coefficient of (0, 0) will be referred to as the zero viewpoints, and the viewpoints with the correction coefficients other than (0, 0) will be referred to as the non-zero viewpoints.

In FIG. 12, the total number of viewpoints is as small as M×M=5×5 viewpoints, and therefore, the non-zero viewpoints are only arranged in one circle. However, in a case where there are a total of 21×21 viewpoints as described above with reference to FIG. 4, for example, the correction coefficients can be set so that the non-zero viewpoints are arranged in a plurality of circles (concentric circles).

Here, the distance between viewpoints adjacent to each other in the horizontal direction or the vertical direction is set to ½, and the distance from the reference viewpoint (the (3, 3)th viewpoint in FIG. 12) is represented by r. In FIG. 12, the correction coefficient for a non-zero viewpoint at the distance r from the reference viewpoint is a vector that has a magnitude of ar in the direction from the non-zero viewpoint toward the reference viewpoint (the (3, 3)th viewpoint in FIG. 12).

Of the magnitude ar of the vector as the correction coefficient for a non-zero viewpoint, "a" can be regarded as the reference for correction coefficients. Therefore, where "a" of the magnitude ar of the vector as the correction coefficient for a non-zero viewpoint is set as the reference coefficient, the degree of blurriness (the extent of blurriness) to be provided to the processing result image has a value proportional to the reference coefficient, as the focus shift amount DP#i is corrected with the correction coefficients.

Thus, blurring with the degree of blurriness desired by the user can be provided through the adjustment of the reference coefficient "a".

Note that, in this case, the correction coefficient that has been set in accordance with a viewpoint vp#i in FIG. 12 is added to the focus shift amount DP#i for the viewpoint vp#i, and thus, the focus shift amount DP#i is corrected. However, similar correction can also be performed by correcting the reference shift amount BV with the reference coefficient "a".

Specifically, 0 is set as the reference coefficient for a zero viewpoint, and a value "a", which is not 0, is set as the reference coefficient for a non-zero viewpoint, depending on whether the viewpoint is a zero viewpoint or a non-zero viewpoint. The reference coefficient (0 or "a") set in accordance with the viewpoint is then added to or subtracted from the reference shift amount BV (subtraction is performed in this embodiment), so that the reference shift amount EV is corrected. Thus, the focus shift amount DP#i for the viewpoint vp#i can be substantially corrected with the correction coefficient that has been set in accordance with the viewpoint vp#i in FIG. 12.

This is because, in a case where disparity conversion is performed on a corrected reference shift amount BV obtained by correcting the reference shift amount BV with the reference coefficient (0 or "a") that has been set in accordance with the viewpoint, the result. of the disparity conversion coincides with the corrected focus shift amount DP#i obtained by correcting the focus shift amount DP#i for the viewpoint vp#i with the correction coefficient that has been set in accordance with the viewpoint vp#i in FIG. 12.

In view of the above, the correction coefficient that has been set in accordance with the viewpoint vp#i in FIG. 12 can be regarded as the correction coefficient for the focus shift amount DP#i, and the reference coefficient (0 or "a") that has been set in accordance with the viewpoint can be regarded as the correction. coefficient for the reference shift amount BV.

Note that the correction coefficient for a non-zero viewpoint on the circumference of any desired circle may be such a coefficient as to correct the vector as the focus shift amount DP#i by the amount, equivalent to the same vector (a vector having the magnitude of "a"), for example. Meanwhile, the correction coefficient for a different non-zero viewpoint may be such a coefficient as to correct the vector as the focus shift amount DP#i by the amount equivalent to a different vector.

For example, coefficients for correcting the vector as the focus shift amount DP#i by different amounts for a non-zero viewpoint on the circumference of a circle and for a non-zero viewpoint on the circumference of another circle can be adopted as correction coefficients.

In the example described below, between the correction coefficients for the focus shift amount DP#i and the correction coefficients for the reference shift amount By, the correction coefficients for the focus shift amount. DP#i are adopted, for ease of explanation.

Figure 13:
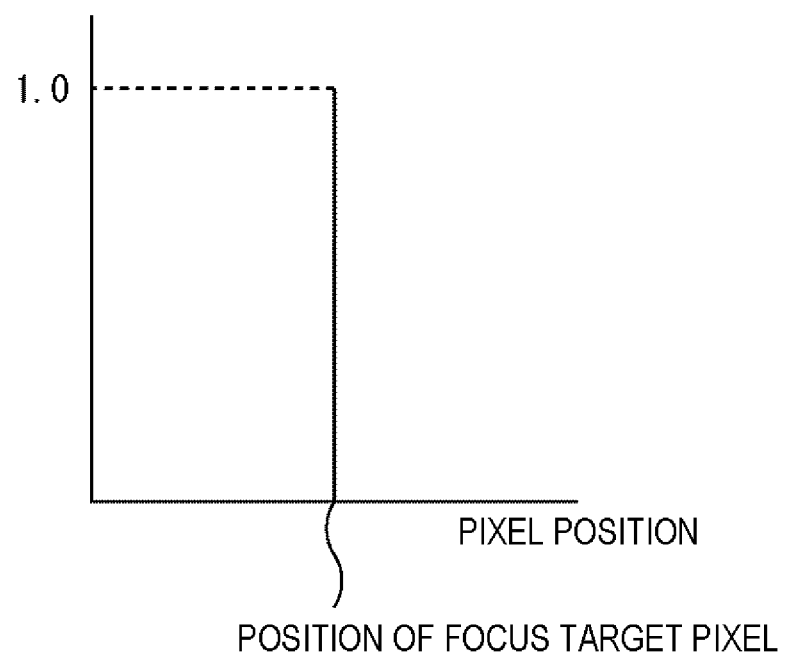
FIG. 13 is a diagram schematically showing an example of a distribution of the intensities of light beams concentrating on the focus target pixel in a case where a focus shift amount DP#i is not corrected.

FIG. 13 is a diagram schematically showing an example of a distribution of the intensities of light beams concentrating on the focus target pixel in a case where the focus shift amount DP#i is not corrected.

In FIG. 13 (and in FIGS. 14 and 15 to be described later), the abscissa axis indicates pixel positions, and the ordinate axis indicates (values equivalent to) the intensities of light beams that pass through the virtual lens and are received by the virtual sensor in the light collection process.

Here, in a case where the focus shift amount DP#i is not corrected, a light beam concentrating on the focus target pixel is also referred to as a light beam to concentrate on the focus target pixel.

At this stage, the intensity of a light beam to concentrate on the focus target pixel is 1.0.

In a case where the focus shift amount DP#i is not corrected, all the light beams to concentrate on the focus target pixel gather within (the region of) one pixel as the focus target pixel, and the intensity of the light beams concentrating on the focus target pixel is 1.0.

In a case where there are a total of M×M viewpoints, the light beams to concentrate on the focus target pixel are the light beams of M×M viewpoints, which are the light beams corresponding to the pixel values of the pixels corresponding to the focus target pixel in the viewpoint images of the M×M viewpoints.

Figure 14:
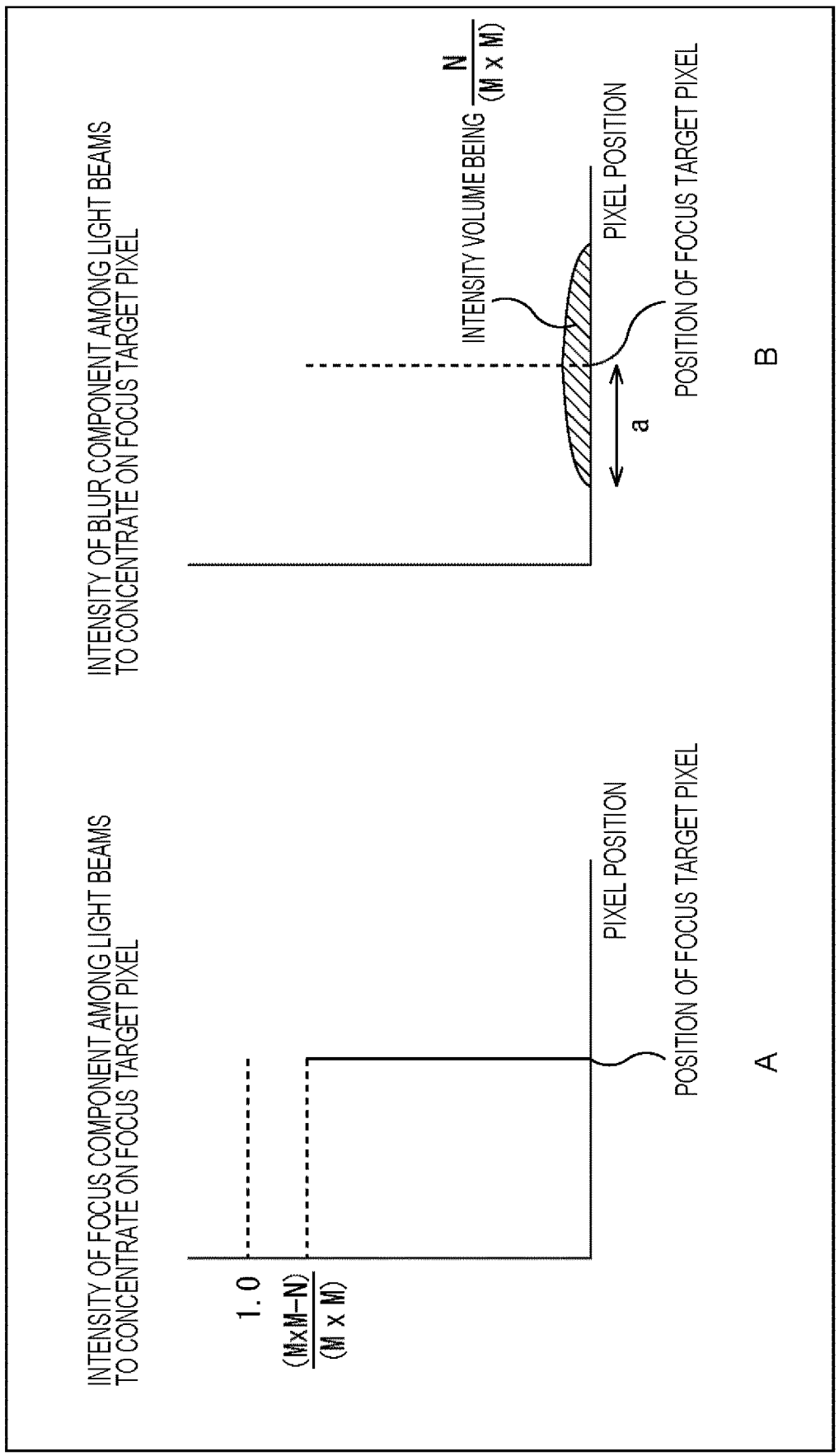
FIG. 14 is a diagram schematically showing an example of distributions of the intensities of light beams to concentrate on the focus target pixel in a case where the focus shift amount DP#i is corrected.

FIG. 14 is a diagram schematically showing an example of distributions of the intensities of light beams to concentrate on the focus target pixel in a case where the focus shift amount DP#i is corrected.

In this example, there are a total of M×M viewpoints, and N viewpoints of the M×M viewpoints are non-zero viewpoints.

In a case where the focus shift amount DP#i for the N viewpoints as the non-zero viewpoints is corrected, the light beams of the M×M−N viewpoints as the zero viewpoints among the light beams of the M×M viewpoints, which are to concentrate on the focus target pixel, gather within the focus target pixel, and the light beams of the N viewpoints as the non-zero viewpoints gather outside the focus target pixel, by virtue of the correction of the focus shift amount DP#i.

Here, the light beams of the M×M−N viewpoints as the zero viewpoints gathering within the focus target pixel contribute to a focused state (an in-focus state), and accordingly, are also called the focus component. On the other hand, the light beams of the N viewpoints as the non-zero viewpoints gathering outside the focus target pixel contribute to blurring, and accordingly, are also called the blur component.

A of FIG. 14 shows the distribution of the intensity of the focus component, and B of FIG. 14 shows the distribution of the intensity of the blur component.

As shown in A of FIG. 14, the focus component gathers within the focus target pixel, and its intensity is equal to the value $((M \times M - N)/(M \times M))$ of the ratio between the number $M \times M - N$ of the light beams as the focus component and the number $M \times M$ of the light beams to concentrate on the focus target pixel.

As shown in B of FIG. 14, the blur component gathers around the focus target pixel, and the intensity volume of the blur component (the volume obtained by integrating the intensity of the blur component with the distribution range of the blur component) is equal to the value $(N/M \times M)$ of the ratio between the number N of the light beams as the blur component and the number M×M of the light beams to concentrate on the focus target pixel.

The blur component is distributed in a range of the size corresponding to the reference coefficient "a" described above with reference to FIG. 12, with the position of the focus target pixel being the center of the range. In other words, the blur component spreads depending on the reference coefficient "a".

Accordingly, the degree of blurriness (the extent of blurriness) can be adjusted with the reference coefficient "a".

Further, the intensity of the focus component and the intensity (volume) of the blur component can be adjusted with the number N of the non-zero viewpoints. Adjustment of the intensity of the focus component and adjustment of the intensity of the blur component is equivalent to adjustment of the intensity of the soft filter.

Figure 15:
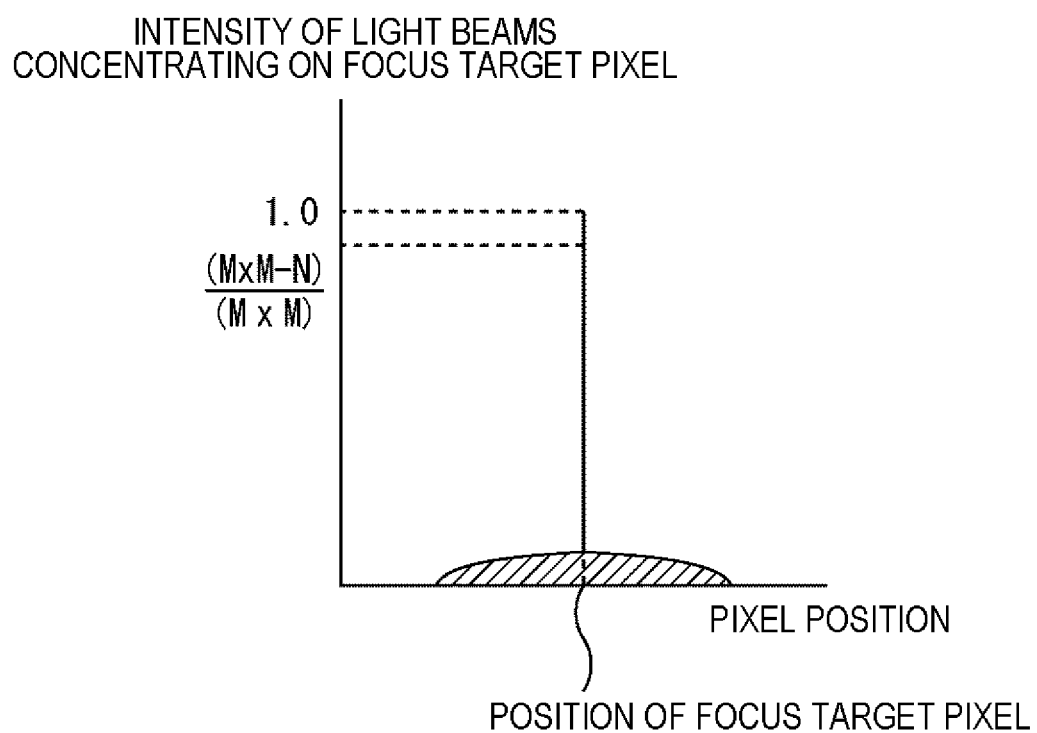
FIG. 15 is a diagram schematically showing an example of a distribution of the intensities of light beams to concentrate on the focus target pixel in a case where the focus shift amount DP#i is corrected.

FIG. 15 is a diagram schematically showing an example of a distribution of the intensities of light beams to concentrate on the focus target pixel in a case where the focus shift amount DP#i is corrected.

The distribution shown in FIG. 15 is a distribution obtained by combining the distribution of the intensity of the focus component shown in A of FIG. 14 and the distribution of the intensity of the blur component shown in B of FIG. 14.

Note that, in a case where a two-dimensional coordinate system that has its x-axis and y-axis in the horizontal direction and the vertical direction, respectively, and has the reference viewpoint set on the origin is adopted as the two-dimensional coordinate system defining the two-dimensional plane for expressing the correction coefficients for the respective viewpoints as shown in FIG. 12, for example, the correction coefficients for the respective viewpoints in the three quadrants including the second through fourth quadrants minus the first quadrant among the first through fourth quadrants of the two-dimensional coordinate system can be set symmetrically to the correction coefficients that are set for the respective viewpoints in the first quadrant, after the setting of the correction coefficients for the respective viewpoints in the first quadrant.

In other words, the correction coefficients for the respective viewpoints in the second quadrant can be set to be symmetrical to the correction coefficients for the respective viewpoints in the first quadrant about the y-axis. The correction coefficients for the respective viewpoints in the third quadrant can be set to be symmetrical to the correction coefficients for the respective viewpoints in the first quadrant about the origin. The correction coefficients for the respective viewpoints in the fourth quadrant can be set to be symmetrical to the correction coefficients for the respective viewpoints in the first quadrant about the x-axis.

As described above, the correction coefficients for the respective viewpoints in the three quadrants excluding one quadrant are set to be symmetrical to the correction coefficients for the respective viewpoints in the one quadrant. Thus, the shapes of blurred portions generated due to the correction of the focus shift amount DP#i with the correction coefficients can be made uniform. In this case, the intensity of the blur component shown in B of FIG. 14 is distributed symmetrically about the position of the focus target pixel, and the distribution of the intensity of the blur component can be prevented from being biased.

Figure 16:
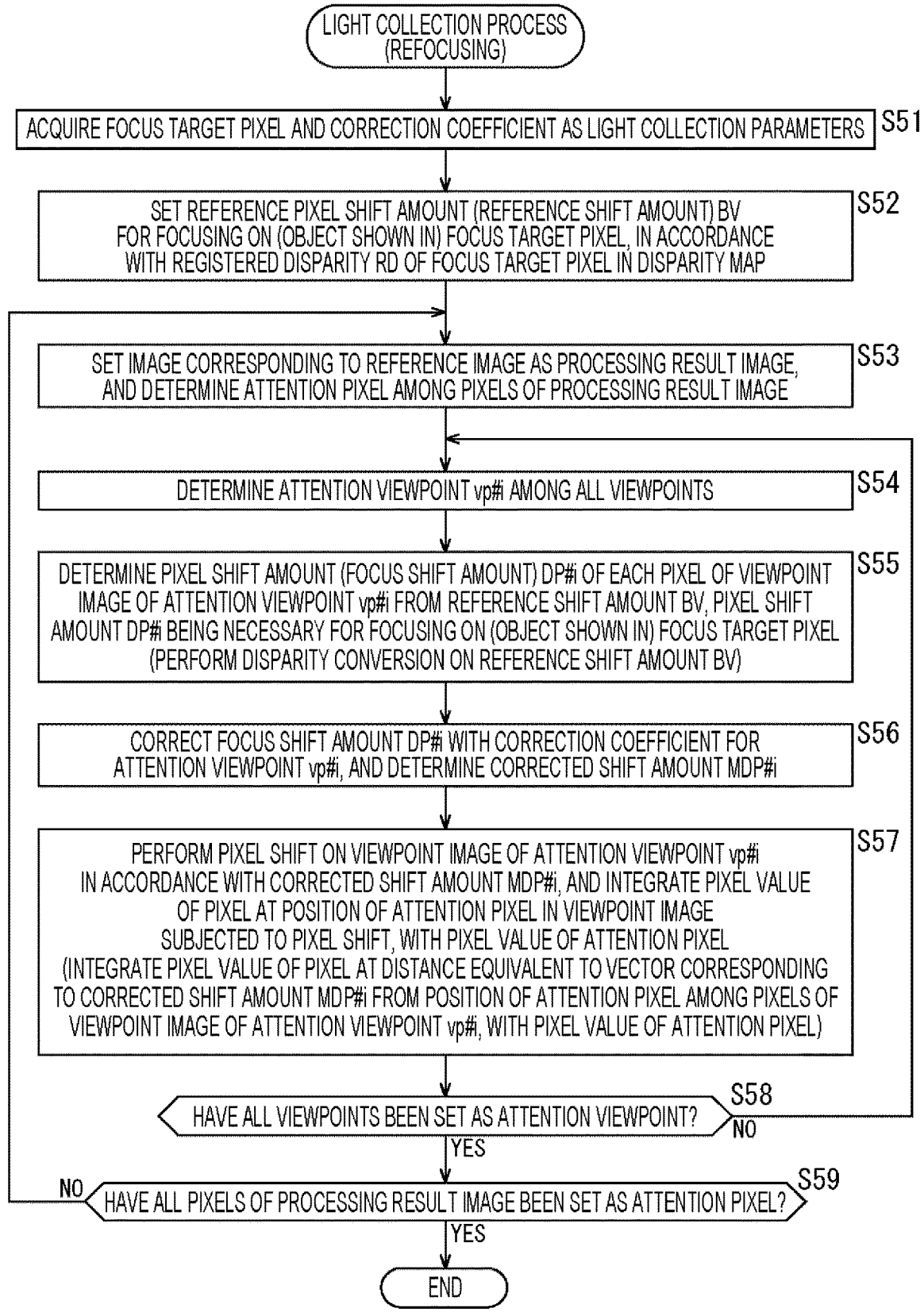
FIG. 16 is a flowchart for explaining another example of a light collection process to be performed by the light collection processing unit 33.

FIG. 16 is a flowchart for explaining another example of a light collection process to be performed by the light collection processing unit 33.

In other words, FIG. 16 is a flow chart showing an example of a light collection process in a case where blurring is caused as if image capturing was performed using a soft filter.

In step S51, the light collection processing unit 33 acquires (information about) a focus target pixel as a light collection parameter from the parameter setting unit 34, as in step S31 in FIG. 11. The light collection processing unit 33 further acquires the correction coefficients for the respective viewpoints as light collection parameters from the parameter setting unit 34, and the process then moves from step S51 on to step S52.

In steps S52 through S55, processes similar to those in respective steps S32 through S35 in FIG. 11 are performed.

Further, step S55, the focus shift amount DP#i of each pixel of the viewpoint image of the attention viewpoint vp#i determined from the reference shift amount BV. The process then moves on to step S56, and the light collection processing unit 33 corrects the focus shift amount DP#i of (each pixel of the viewpoint image of) the attention viewpoint vp#i.

In other words, the light collection processing unit 33 corrects the focus shift amount DP#i of the attention viewpoint vp#i in accordance with the correction coefficient for the attention viewpoint vp#i among the correction coefficients for the respective viewpoints as light collection parameters, to determine a corrected shift amount MDP#i that is the focus shift amount DP#i after the correction.

After that, the process moves from step S56 on to step S57. The light collection processing unit 33 then performs pixel shift on the respective pixels of the viewpoint image of the attention viewpoint vp#i in accordance with the corrected shift amount MDP#i, and integrates the pixel value of the pixel at the position of the attention pixel in the viewpoint image subjected to the pixel shift, with the pixel value of the attention pixel.

In other words, the light collection processing unit 33 integrates the pixel value of the pixel at a distance equivalent to the vector (for example, the corrected shift amount MDP#i×−1 in this case) corresponding to the corrected shift amount MDP#i from the position of the attention pixel among the pixels of the viewpoint image of the attention viewpoint vp#i, with the pixel value of the attention pixel.

The process then moves from step S57 on to step S58. After that, in steps S58 and S59, processes similar to the respective processes in steps S37 and S38 in FIG. 11 are performed.

Note that, in FIG. 16, the focus shift amount DP#i is directly corrected with the correction coefficients that have been set in accordance with the viewpoints. However, as described above with reference to FIG. 12, it is possible to perform refocusing accompanied by blurring as a filter effect of soft filter, by correcting the reference shift amount BV with the correction coefficients that have been set in accordance with the viewpoints.

Furthermore, it is possible to select the light collection process not causing blurring shown in FIG. 11 or the light collection process causing blurring shown in 16, by performing mode switching between a mode for performing the light collection process not causing blurring shown in FIG. 11 and a mode for performing the light collection process causing blurring shown in FIG. 16, for example, in accordance with a user operation or the like. However, even in the mode for performing the light collection process causing blurring shown in FIG. 16, all the correction coefficients for the respective viewpoints may be set to (0, 0), so that the focus shift amount DPS#i is not corrected, and the light collection process not causing blurring shown in FIG. 11 can be performed.

Furthermore, although the reference viewpoint is adopted as the viewpoint of the processing result image in this embodiment, a point other than the reference viewpoint, or any appropriate point or the like within the synthetic aperture of the virtual lens, for example, can be adopted as the viewpoint of the processing result image.

<Description of a Computer to Which the Present Technology is Applied>

Next, the above described series of processes by the image processing device 12 can be performed with hardware, and can also be performed with software. In a case where the series of processes are performed with software, the program that forms the software is installed into a general-purpose computer or the like.

Figure 17:
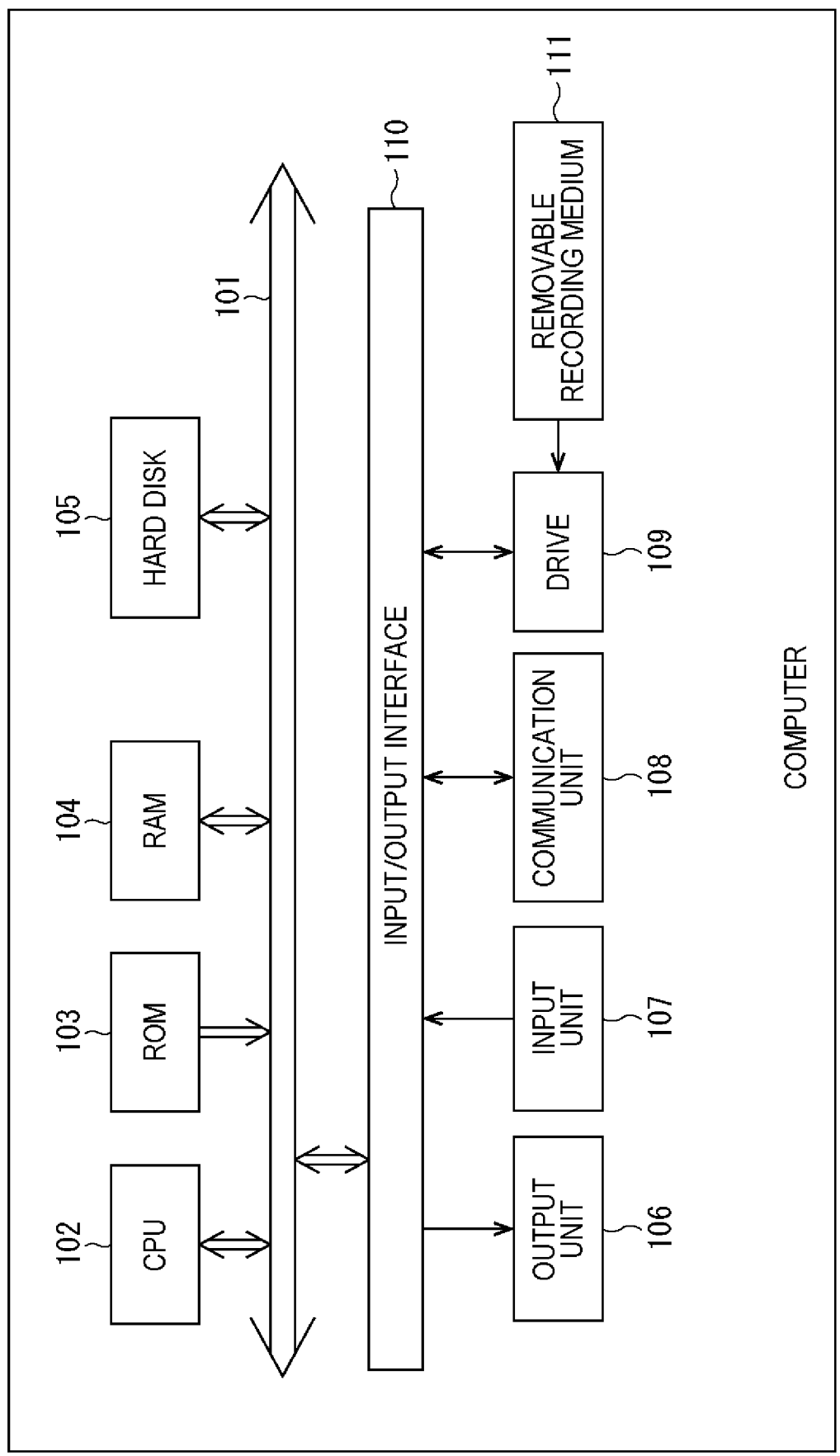
FIG. 17 is a block diagram showing an example configuration. of an embodiment of a computer to which the present technology is applied.

FIG. 17 is a block diagram showing an example configuration of an embodiment of a computer into which the program for performing the above described series of processes is installed.

The program can be recorded beforehand in a hard disk 105 or a ROM 103 provided as a recording medium in the computer.

Alternatively, the program can be stored (recorded) in a removable recording medium 111. Such a removable recording medium 111 can be provided as so-called packaged software. Here, the removable recording medium 111 may be a flexible disk, a compact disc read only memory ((CD-ROM), a magneto-optical (MO) disk, a digital versatile disc (DVD), a magnetic disk, a semiconductor memory, or the like, for example.

Note that the program can be installed into the computer from the above described removable recording medium 111, but can also be downloaded into the computer via a communication network or a broadcasting network and be installed into the internal hard disk 105. In other words, the program can be wirelessly transferred from a download site, for example, to the computer via an artificial satellite for digital satellite broadcasting, or can be transferred by cable to the computer via a network such as a local area network (LAN) or the Internet.

The computer includes a central processing unit (CPU) 102, and an input/output interface 110 is connected to the CPU 102 via a bus 101.

When an instruction is input by a user operating an input unit 107 or the like via the input/output interface 110, the CPU 102 executes the program stored in the read only memory (ROM) 103 in accordance with the instruction. Alternatively, the CPU 102 loads the program stored in the hard disk 105 into a random access memory (RAM) 104, and executes the program.

By doing so, the CPU 102 performs the processes according to the above described flowcharts, or performs the processes with the above described configurations illustrated in the block diagrams. The CPU 102 then outputs the process results from an output unit 106 or transmit the process results from a communication unit 108 via the input/output interface 110, for example, and further stores the process results into the hard disk 105, as necessary.

Note that the input unit 107 is formed with a keyboard, a mouse, a microphone, and the like. Meanwhile, the output unit 106 is formed with a liquid crystal display (LCD), a speaker, and the like.

In this specification, the processes to be performed by the computer in accordance with the program are not necessarily performed in chronological order compliant with the sequences shown in the flowcharts. In other words, the processes to be performed by the computer in accordance with the program include processes to be performed in parallel or independently of one another (such as parallel processes or object-based processes).

Also, the program may be executed by one computer (processor), or may be executed in a distributive manner by a plurality of computers. Further, the program may be transferred to a remote computer, and be executed therein.

Further, in this specification, a system means an assembly of a plurality of components (devices, modules (parts), and the like), and not all the components need to be provided in the same housing. In view of this, a plurality of devices that are housed in different housings and are connected to one another via a network form a system, and one device having a plurality of modules housed in one housing is also a system.

Note that embodiments of the present technology are not limited to the above described embodiments, and various modifications may be made to them without departing from the scope of the present technology.

For example, the present technology can be embodied in a cloud computing configuration in which one function is shared among a plurality of devices via a network, and processing is performed by the devices cooperating with one another.

Further, the respective steps described with reference to the above described flowcharts can be carried out by one device or can be shared among a plurality of devices.

Furthermore, in a case where more than one process is included in one step, the plurality of processes included in the step can be performed by one device or can be shared among a plurality of devices.

Meanwhile, the advantageous effects described in this specification are merely examples, and the advantageous effects of the present technology are not limited to them and may include other effects.

Note that the present technology may also be embodied in the configurations described below.

<1>

An image processing device including:

an acquisition unit that acquires images of plurality of viewpoints; and a light collection processing unit that performs a light collection process to generate a processing result image focused at a predetermined distance, by setting a shift amount for shifting pixels of the images of the plurality of viewpoints, shifting the pixels of the images of the plurality of viewpoints in accordance with the shift amount, and integrating pixel values, in which the light collection processing unit shifts the pixels in accordance with a corrected shift amount obtained by correcting the shift amount with correction coefficients for the respective viewpoints.

<2>

The image processing device according to <1>, in which the light collection processing unit corrects the shift amount with the correction coefficients corresponding to the viewpoints, and shifts the pixels of the images of the viewpoints in accordance with the corrected shift amount.

<3>

The image processing device according to <1>or <2>, in which the correction coefficients are set for the respective viewpoints in accordance with grooves of a soft filter for providing blurring.

<4>

The image processing device according to any one of <1>to <3>, in which, in a two-dimensional plane for expressing the correction coefficients for the respective viewpoints, the correction coefficients for the respective viewpoints in three quadrants excluding one quadrant are set symmetrically to the correction coefficients for the respective viewpoints in the one quadrant.

<5>

The image processing device according to any one of <1>to <4>, in which the images of the plurality of viewpoints include a plurality of captured images captured by a plurality of cameras.

<6>

The image processing device according to <5>, in which the images of the plurality of viewpoints include the plurality of captured images and a plurality of interpolation images generated by interpolation using the captured images.

<7>

The image processing device according to <6>, further including:

a parallax information generation unit that generates parallax information about the plurality of captured images; and an interpolation unit that generates the plurality of interpolation images of different viewpoints, using the captured images and the parallax information.

<8>

An image processing method including:

acquiring images of a plurality of viewpoints; and performing a light collection process to generate a processing result image focused at a predetermined distance, by setting a shift amount for shifting pixels of the images of the plurality of viewpoints, shifting the pixels of the images of the plurality of viewpoints in accordance with the shift amount, and integrating pixel values, in which, in the light collection process, the pixels are shifted in accordance with a corrected shift amount obtained by correcting the shift amount with correction coefficients for the respective viewpoints.

<9>

A program for causing a computer to function as:

an acquisition unit that acquires images of a plurality of viewpoints; and a light collection processing unit that performs a light collection process to generate a processing result image focused at a predetermined distance, by setting a shift amount for shifting pixels of the images of the plurality of viewpoints, shifting the pixels of the images of the plurality of viewpoints in accordance with the shift amount, and integrating pixel values, in which the light collection processing unit shifts the pixels in accordance with a corrected shift amount obtained by correcting the shift amount with correction coefficients for the respective viewpoints.

<A1>

An image processing device including:

a light collection processing unit that performs a light collection process to generate a processing result image focused at a predetermined distance, by setting a shift amount for shifting pixels of images of a plurality of viewpoints, shifting the pixels of the images of the plurality of viewpoints in accordance with the shift. amount, and integrating pixel values, and, in the light collection process, shifts the pixels of the images of the plurality of viewpoints, in accordance with the shift amount corrected with correction coefficients for correcting the shift amount, the correction coefficients having been set in accordance with the viewpoints.

REFERENCE SIGNS LIST

11 Image capturing device
12 Image processing device
13 Display device
$21_1$ to $21_7$, and $21_{11}$ to $21_{19}$ Camera unit
31 Parallax information generation unit
32 Interpolation unit
33 Light collection processing unit
34 Parameter setting unit
101 Bus
102 CPU
103 ROM
104 RAM
105 Hard disk
106 Output unit
107 Input unit
108 Communication unit
109 Drive
110 Input/output interface
111 Removable recording medium

The invention claimed is:

1. An image processing device comprising:
   at least one processor configured to:
      acquire captured images of a plurality of viewpoints from at least one image capturing device;
      set shift amounts for the respective captured images of the plurality of viewpoints in accordance with correction coefficients for the respective viewpoints;
      shift pixels of the respective captured images in accordance with the set shift amounts;
      integrate values of the shifted pixels; and
      generate a processing result image focused at a predetermined distance in accordance with the integrated values of the shifted pixels.

2. The image processing device according to claim 1, wherein
   the at least one processor
      corrects the shift amounts with the correction coefficients for the respective viewpoints, and
      shifts the pixels of the captured images of the plurality of viewpoints in accordance with the corrected shift amounts.

3. The image processing device according to claim 1, wherein the correction coefficients are set for the respective viewpoints in accordance with grooves of a soft filter for providing blurring.

4. The image processing device according to claim 1, wherein, in a two-dimensional plane for expressing the correction coefficients for the respective viewpoints, the correction coefficients for the respective viewpoints in three quadrants excluding one quadrant are set symmetrically to the correction coefficients for the respective viewpoints in the one quadrant.

5. The image processing device according to claim 1, wherein the captured images of the plurality of viewpoints include a plurality of captured images captured by a plurality of the image capturing devices.

6. The image processing device according to claim 5, wherein the captured images of the plurality of viewpoints include the plurality of captured images and a plurality of interpolation images generated by interpolation using the captured images.

7. The image processing device according to claim 6, wherein the at least one processor is further configured to:
   generate parallax information about the plurality of captured images; and
   generate the plurality of interpolation images of different viewpoints, using the captured images and the parallax information.

8. The image processing device according to claim 1 wherein the at least one image capturing device includes a micro-lens array.

9. An image processing method comprising:
   acquiring captured images of a plurality of viewpoints from at least one image capturing device;
   setting shift amounts for the respective captured images of the plurality of viewpoints in accordance with correction coefficients for the respective viewpoints;
   shifting pixels of the respective captured images in accordance with the set shift amounts;
   integrating values of the shifted pixels; and
   generating a processing result image focused at a predetermined distance in accordance with the integrated values of the shifted pixels.

10. A non-transitory computer-readable medium having embodied thereon a program, which when executed by a computer causes the computer to execute a method, the method comprising:
    acquiring captured images of a plurality of viewpoints from at least one image capturing device;
    setting shift amounts for the respective captured images of the plurality of viewpoints in accordance with correction coefficients for the respective viewpoints;
    shifting pixels of the respective captured images in accordance with the set shift amounts;

integrating values of the shifted pixels; and
generating a processing result image focused at a predetermined distance in accordance with the integrated values of the shifted pixels.

* * * * *